(12) United States Patent
Miyazaki et al.

(10) Patent No.: US 9,177,233 B2
(45) Date of Patent: Nov. 3, 2015

(54) DISPLAY PROCESSING APPARATUS, IMAGE FORMING SYSTEM, AND COMPUTER-READABLE STORAGE MEDIUM

(71) Applicants: Ryonosuke Miyazaki, Tokyo (JP); Tomoyoshi Takeuchi, Tokyo (JP); Yasushi Yamaguchi, Tokyo (JP); Hiroaki Suzuki, Tokyo (JP)

(72) Inventors: Ryonosuke Miyazaki, Tokyo (JP); Tomoyoshi Takeuchi, Tokyo (JP); Yasushi Yamaguchi, Tokyo (JP); Hiroaki Suzuki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/339,604

(22) Filed: Jul. 24, 2014

(65) Prior Publication Data

US 2014/0333968 A1 Nov. 13, 2014

Related U.S. Application Data

(63) Continuation of application No. 13/610,153, filed on Sep. 11, 2012, now Pat. No. 8,823,961.

(30) Foreign Application Priority Data

Sep. 14, 2011 (JP) ................................. 2011-200743
Aug. 24, 2012 (JP) ................................. 2012-185616

(51) Int. Cl.
*H04N 1/40* (2006.01)
*G06K 15/02* (2006.01)
(Continued)

(52) U.S. Cl.
CPC .......... *G06K 15/1889* (2013.01); *G03G 15/502* (2013.01); *G03G 15/6585* (2013.01); *G06F 3/1208* (2013.01); *G06K 15/1886* (2013.01); *G03G 2215/00805* (2013.01)

(58) Field of Classification Search
CPC ................. H04N 2201/0094; H04N 1/00408; H04N 1/00411; H04N 1/6008; H04N 1/60; G06K 15/1878; G06K 15/1889; G06K 15/027; G06K 2215/0094; G03G 15/5016; G03G 15/502
USPC ........ 358/1.13, 1.18, 1.9, 2.1, 468, 3.28, 500, 358/504; 399/27–28, 38–40, 223–224, 231
See application file for complete search history.

(56) References Cited

U.S. PATENT DOCUMENTS 6,352,806 B1 3/2002 Dalal
7,304,770 B2 12/2007 Wang et al.
(Continued)

FOREIGN PATENT DOCUMENTS

CN 101834967 A 9/2010
CN 101907843 A 12/2010
(Continued)

OTHER PUBLICATIONS

Chinese Office Action and English translation thereof dated Oct. 10, 2014.

*Primary Examiner* — Thomas D Lee
*Assistant Examiner* — Stephen M Brinich
(74) *Attorney, Agent, or Firm* — Harness, Dickey & Pierce, P.L.C.

(57) ABSTRACT

A display processing apparatus includes a receiving unit configured to receive display information indicating whether gloss-control plane image data is displayed and whether clear plane image data is displayed. The gloss-control plane image data specifies a type of a surface effect applied to a recording medium and a glossy area to which the surface effect is to be applied, and indicates a color of the glossy area when being displayed. The clear plane image data specifies a transparent image formed on the recording medium and indicates a color of the transparent image when being displayed. The apparatus also includes a generating unit configured to synthesize color plane image data indicating a color image and one of the gloss-control plane image data and the clear plane image data that is specified to be displayed thus to generate a synthetic image.

7 Claims, 28 Drawing Sheets

(51) Int. Cl.
*G03G 15/00* (2006.01)
*G06F 3/12* (2006.01)

(56) References Cited

U.S. PATENT DOCUMENTS

| | | |
|---|---|---|
| 8,190,076 B2 | 5/2012 | Omata |
| 8,345,309 B2 | 1/2013 | Nakano |
| 8,345,317 B2 | 1/2013 | Makino et al. |
| 8,368,958 B2 | 2/2013 | Ido |
| 2007/0211269 A1 | 9/2007 | Patrick |
| 2011/0141498 A1 | 6/2011 | Matsushita |
| 2012/0062956 A1 | 3/2012 | Kitagawa et al. |
| 2012/0063802 A1 | 3/2012 | Suzuki et al. |

FOREIGN PATENT DOCUMENTS

| | | |
|---|---|---|
| EP | 2154578 A2 | 2/2010 |
| JP | 2008145784 A | 6/2008 |
| WO | WO-2011008365 A1 | 1/2011 |
| WO | WO-2011083654 A1 | 7/2011 |
| WO | WO-2011083675 A1 | 7/2011 |

FIRST COLOR PLANE
IMAGE DATA

| GLOSSY EFFECT | GLOSSINESS | DEVIATION |
|---|---|---|
| PREMIUM GLOSS (PG) | Gs≥80 | ΔGs≤10 |
| GLOSS (G) | Gs=Gs (SOLID GLOSSY) | ΔGs≤10 |
| MATT (M) | Gs=Gs (1C30% HALFTONE) | ΔGs≤10 |
| PREMIUM MATT (PM) | Gs≤10 | ΔGs≤10 |

FIRST GLOSS-CONTROL PLANE IMAGE DATA

▨ : AREA FOR WHICH PG IS SPECIFIED (DENSITY VALUE 98%)

▨ : AREA FOR WHICH G IS SPECIFIED (DENSITY VALUE 90%)

▤ : AREA FOR WHICH M IS SPECIFIED (DENSITY VALUE 16%)

FIRST CLEAR PLANE IMAGE DATA

FIG.10

| TYPE OF SURFACE EFFECT | DENSITY VALUE [%] |
|---|---|
| PG | 98% |
| G | 90% |
| M | 16% |
| PM | 6% |

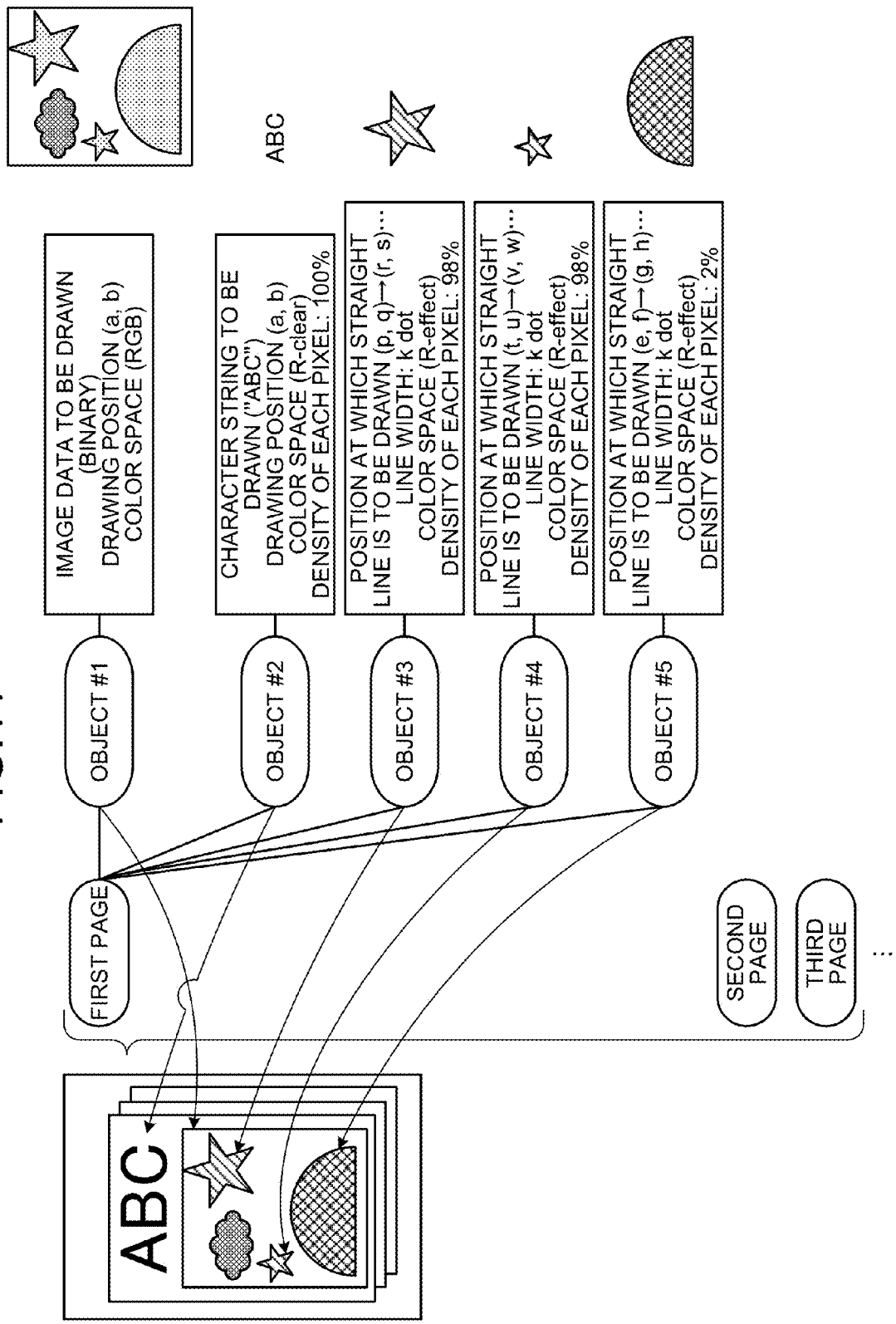

FIG.20

| DENSITY VALUE [%] | DENSITY VALUE | TYPE OF SURFACE EFFECT | ON/OFF | Clr-1 | Clr-2 | Clr-3 | TYPE OF PRACTICABLE SURFACE EFFECT |
|---|---|---|---|---|---|---|---|
| 94% TO 98% | "238" TO "255" | PG | ON | INVERSE MASK 1 | no data | no data | PG |
| 84% TO 90% | "212" TO "232" | G | ON | INVERSE MASK m | SOLID | no data | G |
| 10% TO 16% | "23" TO "43" | M | ON | no data | halftone-n | no data | M |
| 0% TO 6% | "1" TO "17" | PM | ON | no data | no data | SOLID | PM |

DISPLAY PROCESSING APPARATUS, IMAGE FORMING SYSTEM, AND COMPUTER-READABLE STORAGE MEDIUM

CROSS-REFERENCE TO RELATED APPLICATIONS

This application is a continuation application of and claims priority under 35 U.S.C. §120/121 to U.S. application Ser. No. 13/610,153 filed Sep. 11, 2012, which claims priority under 35 U.S.C. §119 to Japanese Patent Application No. 2011-200743 filed in Japan on Sep. 14, 2011 and Japanese Patent Application No. 2012-185616 filed in Japan on Aug. 24, 2012, the contents of each of which are hereby incorporated herein by reference in their entirety and for all purposes.

BACKGROUND OF THE INVENTION

1. Field of the Invention

The present invention relates to a display processing apparatus, an image forming system, and a computer-readable storage medium.

2. Description of the Related Art

Conventionally, there have been developed image forming apparatuses that print an image using a transparent developer besides four color toners of CMYK. Using a transparent developer makes it possible to provide a visual effect and a tactual effect (referred to as a surface effect) on a surface of a recording medium. Furthermore, forming an image with a transparent developer makes it possible to form a transparent image used for prevention of falsification and forgery, for example. For such image forming apparatuses, there has been developed a technology for displaying an image obtained by estimating a printing result before printing, that is, a technology for performing so-called preview display. Japanese Patent Application Laid-open No. 2008-145784, for example, discloses a technology for displaying an image portion to be printed with transparent toner as a preview.

In the technology disclosed in Japanese Patent Application Laid-open No. 2008-145784, however, the whole area to which the transparent toner is to be applied is collectively switched between being displayed or hidden. As a result, if an area to which a surface effect is to be applied using the transparent toner and a transparent image to be printed using the transparent toner both exist, the area to which the surface effect is to be applied and the transparent image cannot be switched to be displayed as a preview.

Therefore, there is a need for a display processing apparatus, an image forming system, and a computer-readable storage medium that can switch between an area to which a surface effect is to be applied and a transparent image as preview display.

SUMMARY OF THE INVENTION

It is an object of the present invention to at least partially solve the problems in the conventional technology.

According to an embodiment, there is provided a display processing apparatus that includes a receiving unit configured to receive display information indicating whether gloss-control plane image data is displayed and whether clear plane image data is displayed. The gloss-control plane image data specifies a type of a surface effect applied to a recording medium and a glossy area to which the surface effect is to be applied, and indicates a color of the glossy area when being displayed. The clear plane image data specifies a transparent image formed on the recording medium and indicates a color of the transparent image when being displayed. The display processing apparatus also includes a generating unit configured to synthesize color plane image data indicating a color image and one of the gloss-control plane image data and the clear plane image data that is specified to be displayed by the display information thus to generate a synthetic image; and a display control unit configured to make a control that displays the synthetic image on a display unit.

According to another embodiment, there is provided an image forming system that includes a printing unit configured to form an image on a recording medium based on document data; and a display processing apparatus configured to display a synthetic image indicating a preview image obtained by estimating a result of printing performed by the printing unit on a display unit. The display processing apparatus includes a receiving unit configured to receive display information indicating whether gloss-control plane image data is displayed and whether clear plane image data is displayed. The gloss-control plane image data specifies a type of a surface effect applied to a recording medium and a glossy area to which the surface effect is to be applied, and indicates a color of the glossy area when being displayed. The clear plane image data specifies a transparent image formed on the recording medium and indicates a color of the transparent image when being displayed. The gloss-control plane image data and the clear plane image data are generated based on the document data. The image forming system includes a generating unit configured to synthesize color plane image data indicating a color image and one of the gloss-control plane image data and the clear plane image data that is specified to be displayed by the display information thus to generate a synthetic image; and a display control unit configured to make a control that displays the synthetic image on the display unit.

According to still another embodiment, there is provided a non-transitory computer-readable recording medium with an executable program stored thereon. The program instructs a processor to perform receiving display information indicating whether gloss-control plane image data is displayed and whether clear plane image data is displayed, the gloss-control plane image data specifying a type of a surface effect applied to a recording medium and a glossy area to which the surface effect is to be applied, the gloss-control plane image data indicating a color of the glossy area when being displayed, the clear plane image data specifying a transparent image formed on the recording medium and indicating a color of the transparent image when being displayed; synthesizing color plane image data indicating a color image and one of the gloss-control plane image data and the clear plane image data that is specified to be displayed by the display information thus to generate a synthetic image; and displaying the synthetic image on a display unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a schematic of an example of a density value selection table;

FIG. 11 is a schematic of an example of document data structure;

FIG. 20 is a schematic of an example of a surface effect selection table;

DETAILED DESCRIPTION OF THE PREFERRED EMBODIMENTS

Exemplary embodiments of a display processing apparatus, an image forming system, and a display processing program according to the present invention are described below in greater detail with reference to the accompanying drawings.

First Embodiment

Figure 1:
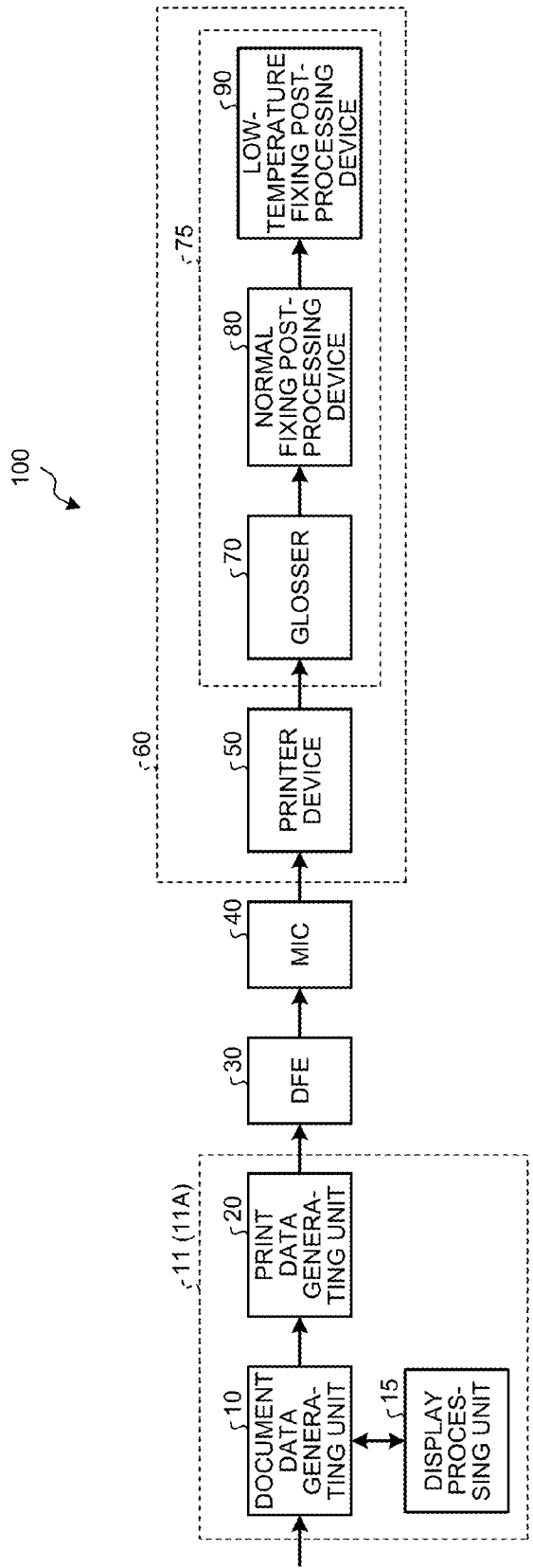
FIG. 1 is a block diagram of an exemplary schematic configuration of an image forming system according to a first embodiment of the present invention.

FIG. 1 is a block diagram of an exemplary schematic configuration of an image forming system 100 according to a first embodiment of the present invention. As illustrated in FIG. 1, the image forming system 100 includes a host device 11, a printer control device (a digital front end, hereinafter referred to as a DFE) 30, an interface control unit (a mechanism I/F control unit, hereinafter it may be referred to as an MIC) 40, and a printing apparatus 60. The host device 11, the DFE 30, the MIC 40, and the printing apparatus 60 are connected via a wired or wireless communication line in a manner capable of transmitting and receiving data to and from one another.

The host device 11 is formed of a personal computer (PC), for example, and includes function units, such as a document data generating unit 10, a print data generating unit 20, and a display processing unit 15. In the present embodiment, an explanation will be made of the case where the host device 11 includes the function units of the document data generating unit 10, the print data generating unit 20, and the display processing unit 15. However, the function units of the document data generating unit 10, the print data generating unit 20, and the display processing unit 15 may be configured as separate components (may be mounted on another PC, for example) and are not necessarily provided to one device integrally.

The host device 11 may be connected to a communication line, such as the Internet, and may be connected to the DFE 30 via the communication line in a manner capable of transmitting and receiving data to and from the DFE 30.

Figure 2:
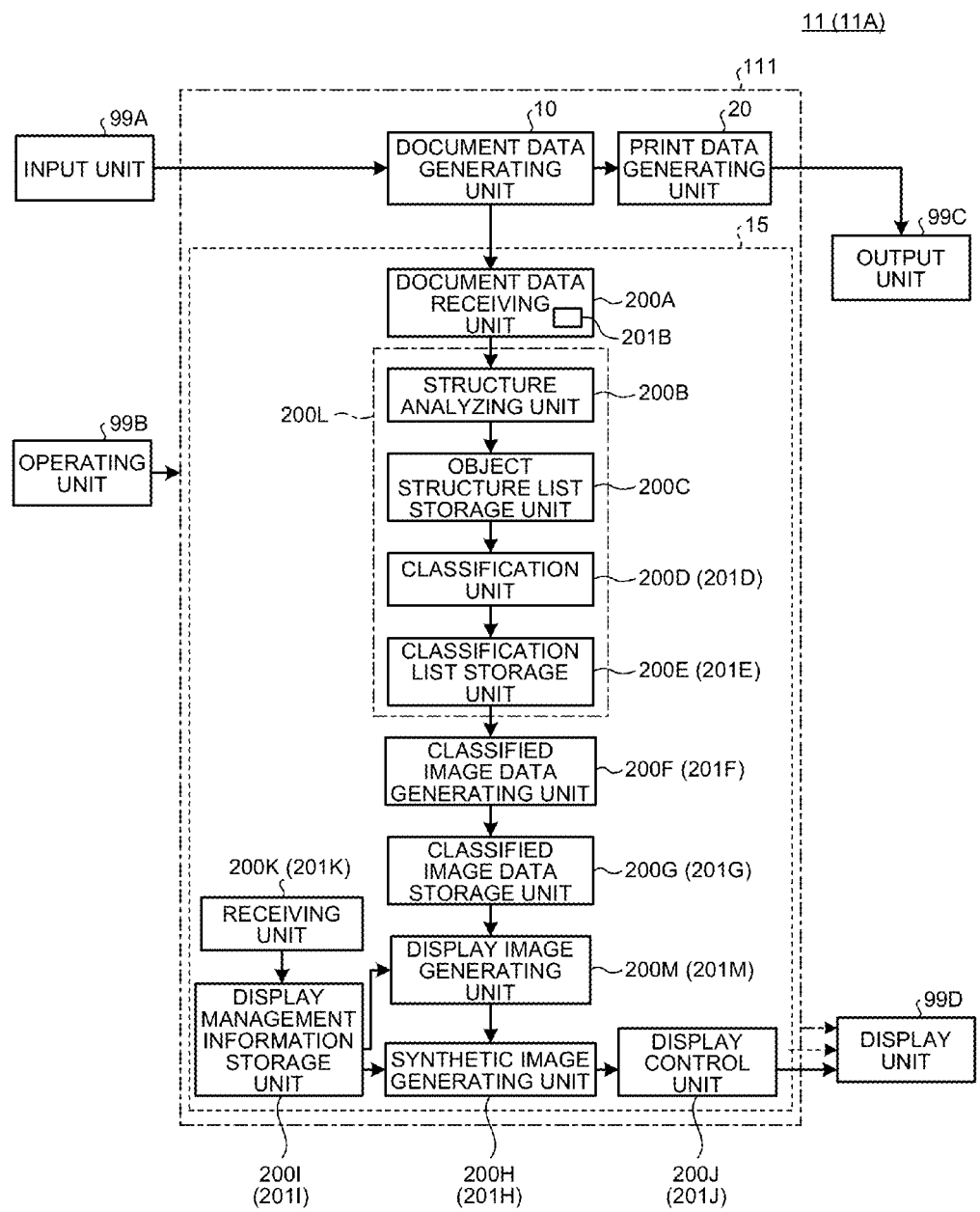
FIG. 2 is a functional block diagram of a host device according to the first embodiment and a second embodiment of the present invention.

FIG. 2 illustrates an example of a specific configuration of the host device 11.

As illustrated in FIG. 2, the host device 11 includes an input unit 99A, an operating unit 99B, an output unit 99C, a display unit 99D, and a control unit 111.

The input unit 99A receives first color plane image data, which will be described later, from an external device, such as a personal computer. The operating unit 99B is an input device operated by a user to issue various types of operation instructions. Examples of the operating unit 99B include a button, a remote control receiving unit, and a card reader that reads information from an integrated circuit (IC) card. The operating unit 99B may include a keyboard.

The output unit 99C is an interface device that communicates with the DFE 30. The display unit 99D is a display device that displays various types of information, and a known display device is used for the display unit 99D.

The control unit 111 is a unit that controls the host device 11 collectively and is a computer including a central processing unit (CPU), a read-only memory (ROM), and a random access memory (RAM), for example.

In the present embodiment, as illustrated in FIG. 2, the host device 11 includes the document data generating unit 10, the print data generating unit 20, and the display processing unit 15 as the function units provided to the control unit 111, for example. These function units and functions included in the function units are realized by the CPU of the control unit 111 loading and executing various types of computer programs stored in the ROM and the like on the RAM. Furthermore, at least a part of these functions can be realized by an individual circuit (hardware).

The document data generating unit 10 receives first color plane image data (which will be described later in detail). The document data generating unit 10 then generates document data by adding information of a characterized plane (first gloss-control plane image data and first clear plane image data, which will be described later) indicating a glossy area to which a surface effect is to be applied, the type of the surface effect, a transparent image, and an area in which the transparent image is to be formed to the first color plane image data, and outputs the document data to the print data generating unit 20 and the display processing unit 15. The document data generating unit 10 may create the first color plane image data as well.

The print data generating unit 20 generates print data (which will be described later in detail) based on the document data. The display processing unit 15 generates a synthetic image indicating a preview image obtained by estimating a printing result of the document data based on the document data (which will be described later in detail).

Specifically, the document data is image data including the first color plane image data, the first gloss-control plane image data, and the first clear plane image data.

The first color plane image data, the first clear plane image data, and the first gloss-control plane image data are generated in a portable document format (PDF) in units of pages, for example. By integrating the first clear plane image data, the first gloss-control plane image data, and the first color plane image data, document data is generated. The data format of the first clear plane image data, the first gloss-control plane image data, and the first color plane image data is not limited to PDF and may be an arbitrary format. In the first clear plane image data, the first gloss-control plane image data, and the first color plane image data, each drawing area, which will be described later, is expressed in a vector format, for example.

In more detail, the first color plane image data is image data indicating a color image to be printed using a color developer for each drawing area.

Figures 3, 4:
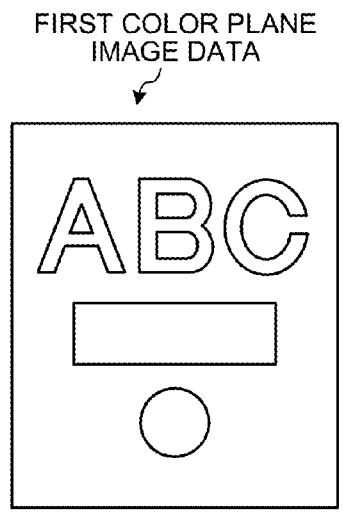
FIG. 3 is a schematic of an example of first color plane image data.
FIG. 4 is an exemplary schematic of the types of surface effects.

Specifically, the first color plane image data is image data specifying density values of colors, such as RGB and CMYK, for each drawing area. FIG. 3 is a view for explaining an example of the first color plane image data. In FIG. 3, a density value corresponding to a color specified by the user is applied to each drawing area, such as "A", "B", and "C". The density value of each drawing area is represented by a density value from 0 to 100%, for example (or may be represented by 0 to 255, for example).

Examples of the color developer include liquid and toner including color materials, such as CMYK. In the present embodiment, an explanation will be made of the case where color toner including each color material of CMYK is used as the color developer, for example.

The first gloss-control plane image data is image data indicating the type of surface effect and a glossy area to which the surface effect is to be applied for each drawing area. The surface effect is a visual or tactual effect applied to a recording medium. The glossy area is realized by applying a transparent developer to the recording medium.

The transparent toner is colorless and transparent toner including no color material. Being transparent and colorless means that the transmittance of visible light is equal to or larger than 70%. In the present embodiment, an explanation will be made of the case where transparent toner (hereinafter, referred to as clear toner) is used as the transparent developer, for example.

The clear toner is transparent toner including no color material.

The types of surface effects are roughly classified into four as illustrated in FIG. 4. An explanation will be made of the case where the four types are Premium Gloss (PG) (mirror-surface glossy), Gloss (G) (solid glossy), Matt (M) (halftone matte), and Premium Matt (PM) (delustered) in descending order of degrees of gloss (grossiness). Alternatively, the types may be classified more minutely.

In the first gloss-control plane image data, the density value of each glossy area (drawing area) is represented by a density value from 0 to 100%, for example (or may be represented by 0 to 255, for example) in the same manner as in the first color plane image data. The types of surface effects are associated with the density values. In FIG. 4, "PG" indicates glossiness Gs of equal to or larger than 80, "G" indicates solid glossiness in a primary color or a secondary color, "M" indicates glossiness in a primary color and a halftone dot of 30%, and "PM" indicates glossiness of equal to or smaller than 10. Furthermore, the deviation in the glossiness is represented by $\Delta Gs$, and is equal to or smaller than 10. For the types of surface effects, a higher density value is associated with a surface effect having a higher degree of application of a gloss, whereas a lower density value is associated with a surface effect that suppresses a gloss.

To which area in a color image the surface effect is to be applied and which type of surface effect is to be applied to the area are specified by the user. The document data generating unit 10 of the host device 11 sets a density value corresponding to the surface effect specified by the user for each drawing area specified by the user, thereby generating first gloss-control plane image data. The correspondence relationship between the density value and the types of surface effects will be described later in detail.

Figure 5:
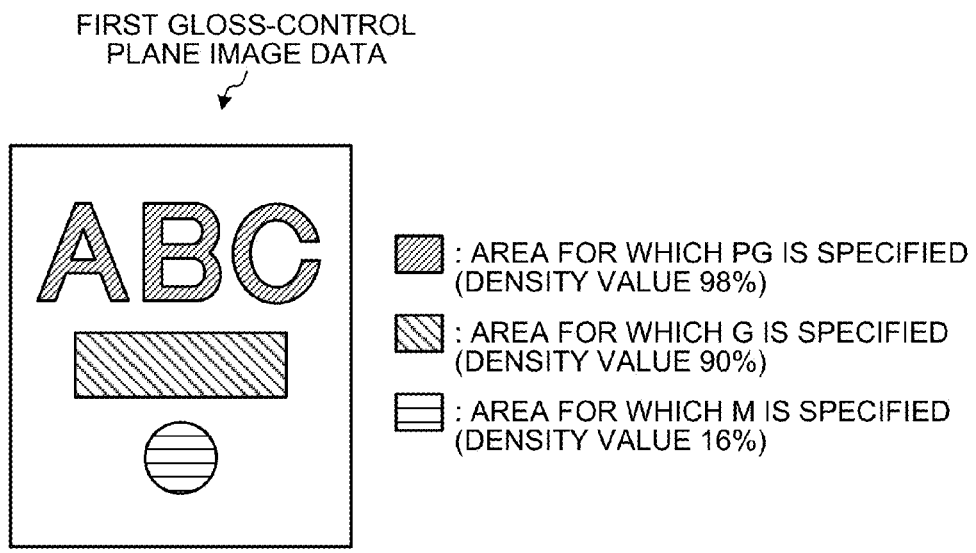
FIG. 5 is a schematic of an example of first gloss-control plane image data.

FIG. 5 is a view for explaining an example of the first gloss-control plane image data. In the example of the first gloss-control plane image data in FIG. 5, the user applies the surface effect "PG" to a drawing area "ABC", applies the surface effect "G" to a drawing area of a rectangle figure, and applies the surface effect "M" to a drawing area of a circular figure. The density value set to each surface effect is a density value specified in a manner corresponding to the type of surface effect in a density value selection table, which will be described later.

The first clear plane image data is image data indicating a transparent image to be printed using clear toner (transparent developer) for each drawing area. The transparent image indicates a drawing area formed using the clear toner in an area other than a glossy area to which the surface effect is to be applied. Examples of the transparent image include a watermark.

Figure 6:
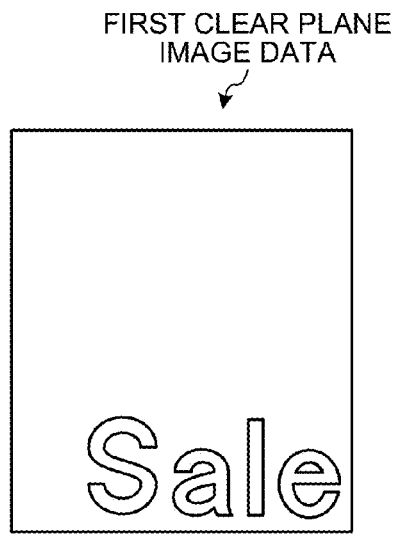
FIG. 6 is a schematic of an example of first clear plane image data.

FIG. 6 is a view for explaining an example of the first clear plane image data. In the example of FIG. 6, the user specifies a watermark "Sale" as a transparent image.

As described above, the first clear plane image data and the first gloss-control plane image data are generated on different planes from that of the first color plane image data by the document data generating unit 10 of the host device 11.

Figure 7:
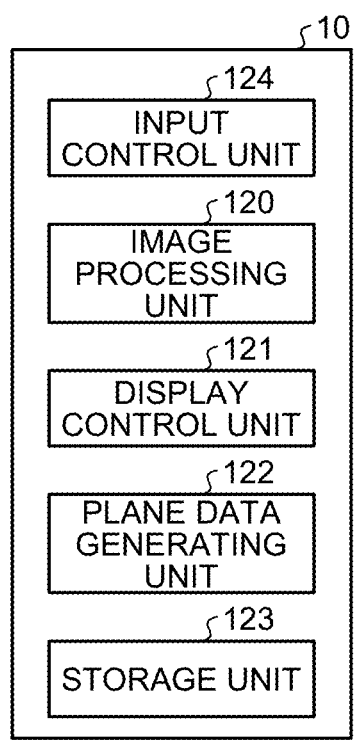
FIG. 7 is a functional block diagram of a document data generating unit.

FIG. 7 is a functional block diagram of the document data generating unit 10.

The document data generating unit 10 mainly includes an input control unit 124, an image processing unit 120, a display control unit 121, a plane data generating unit 122, and a storage unit 123.

The input control unit 124 receives various types of input from the input unit 99A (refer to FIG. 2) and controls the input. By operating the input unit 99A, for example, the user can input image specification information for specifying an image to which a surface effect is to be applied among various types of images (e.g., photos, characters, figures, and images obtained by synthesizing these elements) stored in the storage unit 123, that is, image specification information for specifying the first color plane image data (hereinafter, it may be referred to as a "target image"). The method for inputting the image specification information is not limited thereto, and an arbitrary method may be employed.

The display control unit 121 controls display of various types of information on the display unit 99D (refer to FIG. 2). In the present embodiment, if the input control unit 124 receives image specification information, the display control unit 121 reads an image specified by the image specification information from the storage unit 123 and controls the display unit 99D so as to display the image thus read on a screen.

By operating the input unit 99A while checking the target image displayed on the display unit 99D, the user can input specification information for specifying a glossy area to which a surface effect is to be applied and the type of the surface effect. The method for inputting the specification information is not limited thereto, and an arbitrary method may be employed.

Figure 8:
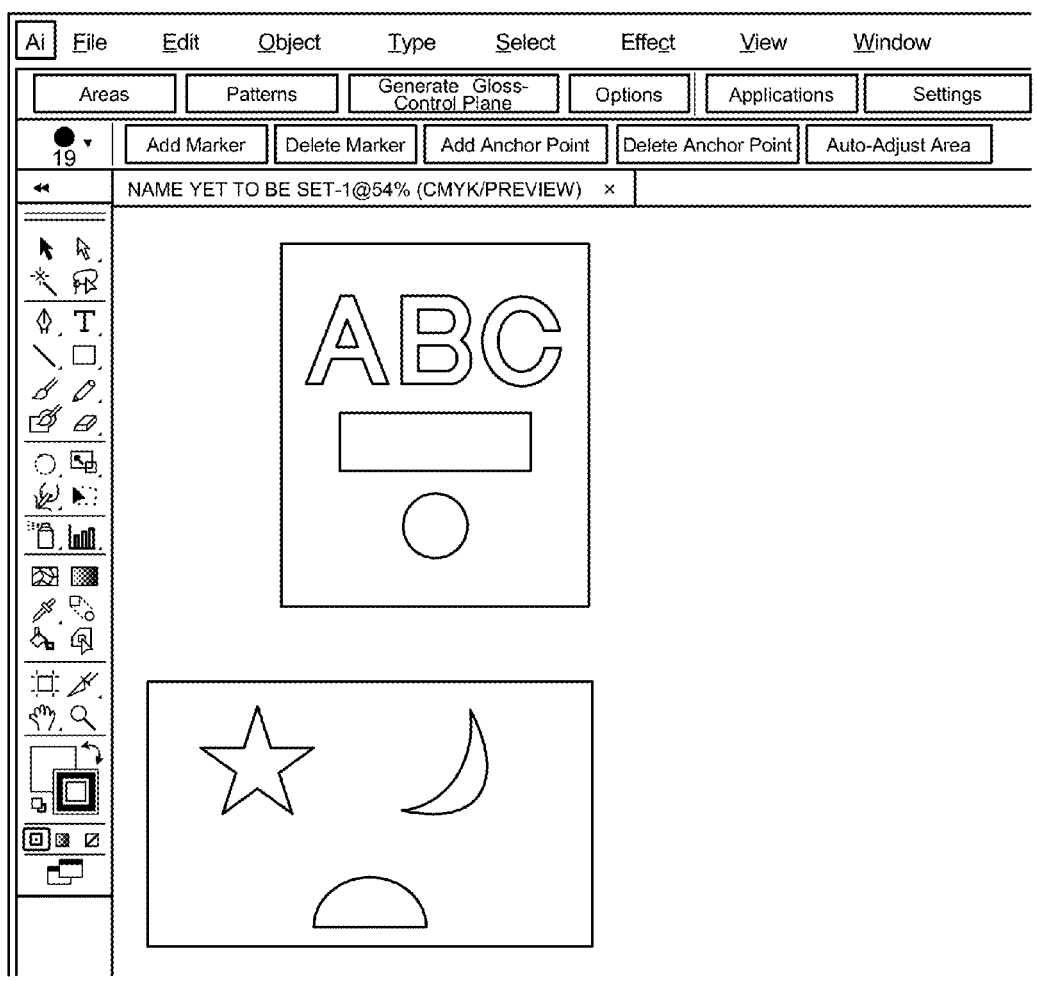
FIG. 8 is a schematic of an exemplary screen to be displayed.
Figure 9:
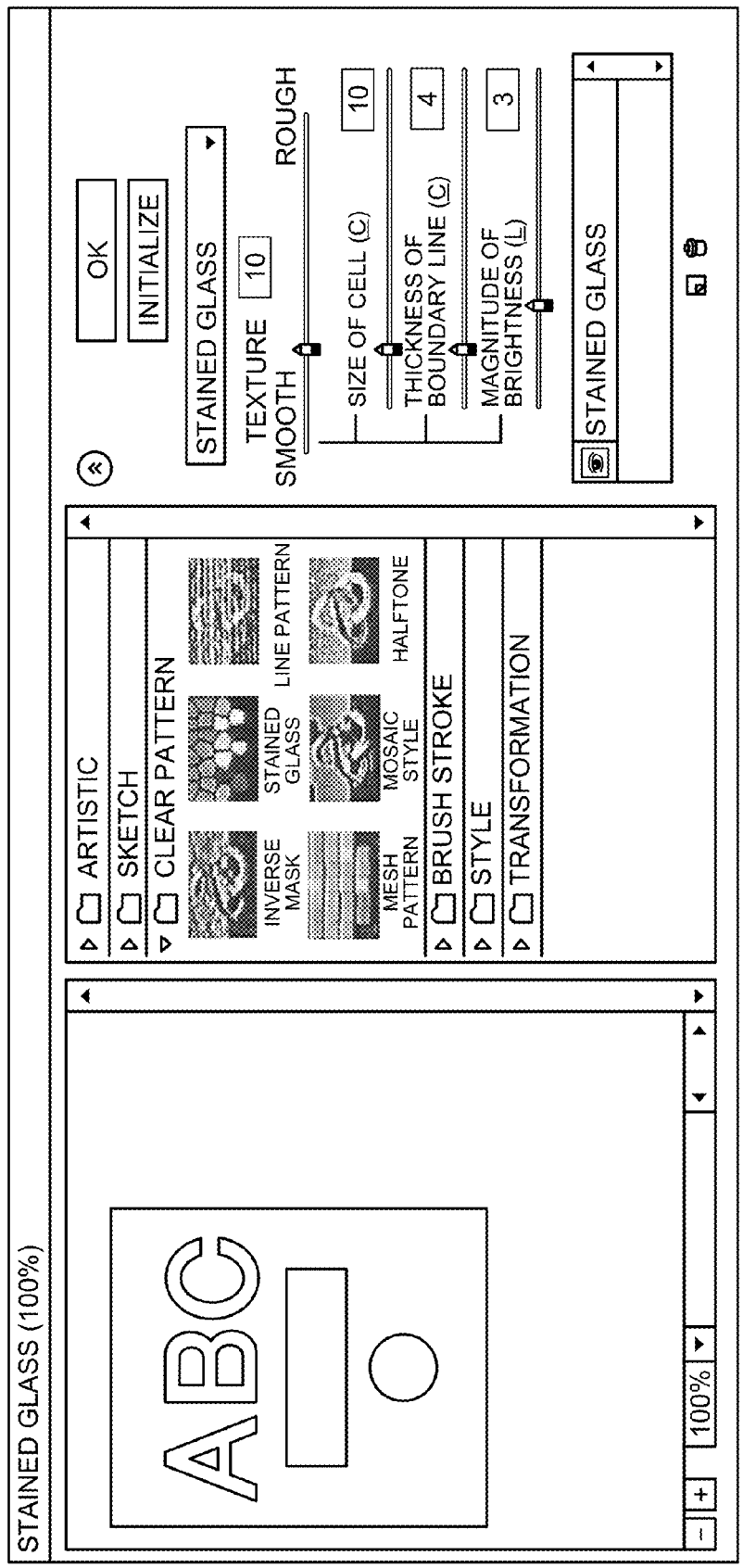
FIG. 9 is a schematic of another exemplary screen to be displayed.

More specifically, the display control unit 121 causes the display unit 99D to display a screen illustrated in FIG. 8, for example. FIG. 8 is an example of a screen displayed when a plug-in is incorporated into Illustrator® marketed by Adobe Systems Incorporated. The screen illustrated in FIG. 8 displays an image indicated by target image data (the first color plane image data) to be processed. If the user presses a marker Add button through the input unit 99A to perform an input operation for specifying a glossy area to which a surface effect is desired to be applied, the glossy area to which the surface effect is to be applied is specified. The user performs such operation input on all the glossy areas to which the surface effect is to be applied. The display control unit 121 then causes the display unit 99D to display a screen illustrated in FIG. 9 for each glossy area (drawing area) thus specified, for example. The screen illustrated in FIG. 9 displays an image indicating a drawing area of a glossy area for each glossy area (drawing area) specified as an area to which a surface effect is to be applied. If the user performs an input operation for specifying the type of surface effect desired to be applied to the image (drawing area) through the input unit 99A, the type of surface effect to be applied to the area is specified.

Referring back to FIG. 7, the image processing unit 120 performs various types of image processing on the target image based on an instruction input by the user through the input unit 99A (refer to FIG. 2).

If the input control unit 124 receives specification information (a glossy area to which a surface effect is to be applied and the type of the surface effect), the plane data generating unit 122 generates the first gloss-control plane image data based on the specification information. If the input control unit 124 receives specification of a transparent image, the plane data generating unit 122 generates the first clear plane image data in accordance with the specification input by the user.

The storage unit 123 stores therein a density value selection table that stores therein the types of surface effects and density values corresponding to the types of surface effects. FIG. 10 is a schematic of an example of the density value selection table. In the example illustrated in FIG. 10, the density value corresponding to "PG" is 98%, the density value corresponding to "G" is 90%, the density value corresponding to "M" is 16%, and the density value corresponding to "PM" is 6%. The types of surface effects may be set in a manner classified more minutely.

Referring back to FIG. 7, the plane data generating unit 122 sets the density value of the drawing area for which a predetermined surface effect is specified by the user to a value corresponding to the type of the surface effect referring to the density value selection table illustrated in FIG. 10, thereby generating the first gloss-control plane image data. The first gloss-control plane image data generated by the plane data generating unit 122 is data in a vector format expressed as a set of drawing areas indicating coordinates of points, parameters of equations of lines and planes connecting the points, and fill and special effects, for example.

The plane data generating unit 122 generates document data by integrating the first gloss-control plane image data, the first color plane image data serving as the target image, and the first clear plane image data, and transfers the document data to the print data generating unit 20 and the display processing unit 15.

The print data generating unit 20 will now be described.

The print data generating unit 20 generates print data based on the document data thus received. The print data includes the document data and a job command specified for a printer. Examples of the job command include setting of the printer, setting of intensive printing, and setting of duplex printing. The print data may be converted into a page description language (PDL), such as PostScript, or may remain in the PDF as long as the DFE 30 is compatible with the PDF.

Referring back to FIG. 2, the display processing unit 15 will now be described.

The display processing unit 15 receives the document data from the document data generating unit 10, generates a synthetic image of a preview image obtained by estimating a printing result of the document data, and causes the display unit 99D to display the synthetic image.

As illustrated in FIG. 2, the display processing unit 15 includes a document data receiving unit 200A, an analyzing unit 200L (an analyzing unit), a classified image data generating unit 200F (a first generating unit), a classified image data storage unit 200G, a display image generating unit 200M (a second generating unit), a receiving unit 200K (a receiving unit), a display management information storage unit 200I, a display control unit 200J, and a synthetic image generating unit 200H (a third generating unit).

The analyzing unit 200L includes a structure analyzing unit 200B (a structure analyzing unit), an object structure list storage unit 200C, a classification unit 200D (a classification unit), and a classification list storage unit 200E.

The object structure list storage unit 200C, a primary memory 201B, which will be described later, the classification list storage unit 200E, the classified image data storage unit 200G, and the display management information storage unit 200I may be a primary memory, such as a RAM, or may be a storage medium, such as a hard disk drive (HDD).

The document data receiving unit 200A receives document data from the document data generating unit 10. The document data receiving unit 200A makes the document data referable in the display processing unit 15. Specifically, the document data receiving unit 200A refers to a file extension or a file header of the document data on a page specified as a preview target, for example, thereby determining whether the document data is in a compatible file format in the display processing unit 15. The document data receiving unit 200A makes the document data compatible by cancelling a file lock, for example. The document data receiving unit 200A then loads the document data on the primary memory 201B provided to the document data receiving unit 200A.

The analyzing unit 200L analyzes document data received by the document data receiving unit 200A. Specifically, as described above, the analyzing unit 200L includes the structure analyzing unit 200B (structure analyzing unit), the object structure list storage unit 200C, the classification unit 200D (classification unit), and the classification list storage unit 200E.

The structure analyzing unit 200B analyzes a data structure of the document data loaded on the primary memory 201B and creates an object structure list indicating a drawing area (hereinafter, it may be referred to as an object) included in each page of the document data.

The object structure list is information indicating a list of drawing areas included in each page of the document data. Specifically, the structure analyzing unit 200B analyzes an object, which is one or a plurality of drawing areas included in each of the first color plane image data, the first gloss-control plane image data, and the first clear plane image data of the document data, and creates an object structure list indicating drawing information (e.g., the position, the color space, and the density of the drawing area) of each object.

FIG. 11 illustrates an example of the structure of the document data. An assumption is made that the document data receiving unit 200A receives document data having the structure illustrated in FIG. 11 as document data serving as a preview target, for example.

The document data includes drawing information indicating one or a plurality of drawing areas (objects) specified by the first color plane image data, the first gloss-control plane image data, and the first clear plane image data in one page (in a single page). In FIG. 11, the document data includes five objects of an object #1 to an object #5 on the first page, for example.

In the example illustrated in FIG. 11, the object #1 corresponds to a drawing area of a color image specified by the first color plane image data. The object #2 corresponds to a drawing area of a transparent image specified by the first clear plane image data. The object #3 to the object #5 each corresponds to a drawing area specified by the first gloss-control plane image data.

The document data includes information indicating the position, the color space, and the density of a drawing area for each object as drawing information. The position of a drawing area is represented by coordinate information or a set of pieces of coordinate information, for example. The color space indicates which of a color image, a transparent image, and a glossy area each drawing area (object) corresponds to. In FIG. 11 and figures, which will be described later, a transparent image may be denoted as R-clear. A glossy area may be denoted as R-effect. A color image may be denoted as RGB. An explanation will be made of the case where a density value (0 to 100%) is set as the density of each object. In the example illustrated in FIG. 11, a drawing area group of color images specified by the first color plane image data is considered as one object (drawing area).

Referring back to FIG. 2, the explanation will be continued. The structure analyzing unit 200B determines which of a drawing area of a color image specified by the first color plane image data, a drawing area of a transparent image specified by the first clear plane image data, and a drawing area specified by the first gloss-control plane image data one or a plurality of drawing areas that can be included in such document data correspond to. The structure analyzing unit 200B reads the color space indicated by the drawing information of each drawing area, thereby determining which of a color image, a glossy area, and a transparent image each drawing area (object) corresponds to. In other words, the structure analyzing unit 200B determines which of drawing areas specified by the first color plane image data, the first gloss-control plane image data, and the first clear plane image data each drawing area (object) corresponds to.

Furthermore, the structure analyzing unit 200B creates an object structure list indicating a list of drawing areas of color images specified by the first color plane image data, drawing areas of transparent images specified by the first clear plane image data, and drawing areas specified by the first gloss-control plane image data included in the document data.

Figure 13:
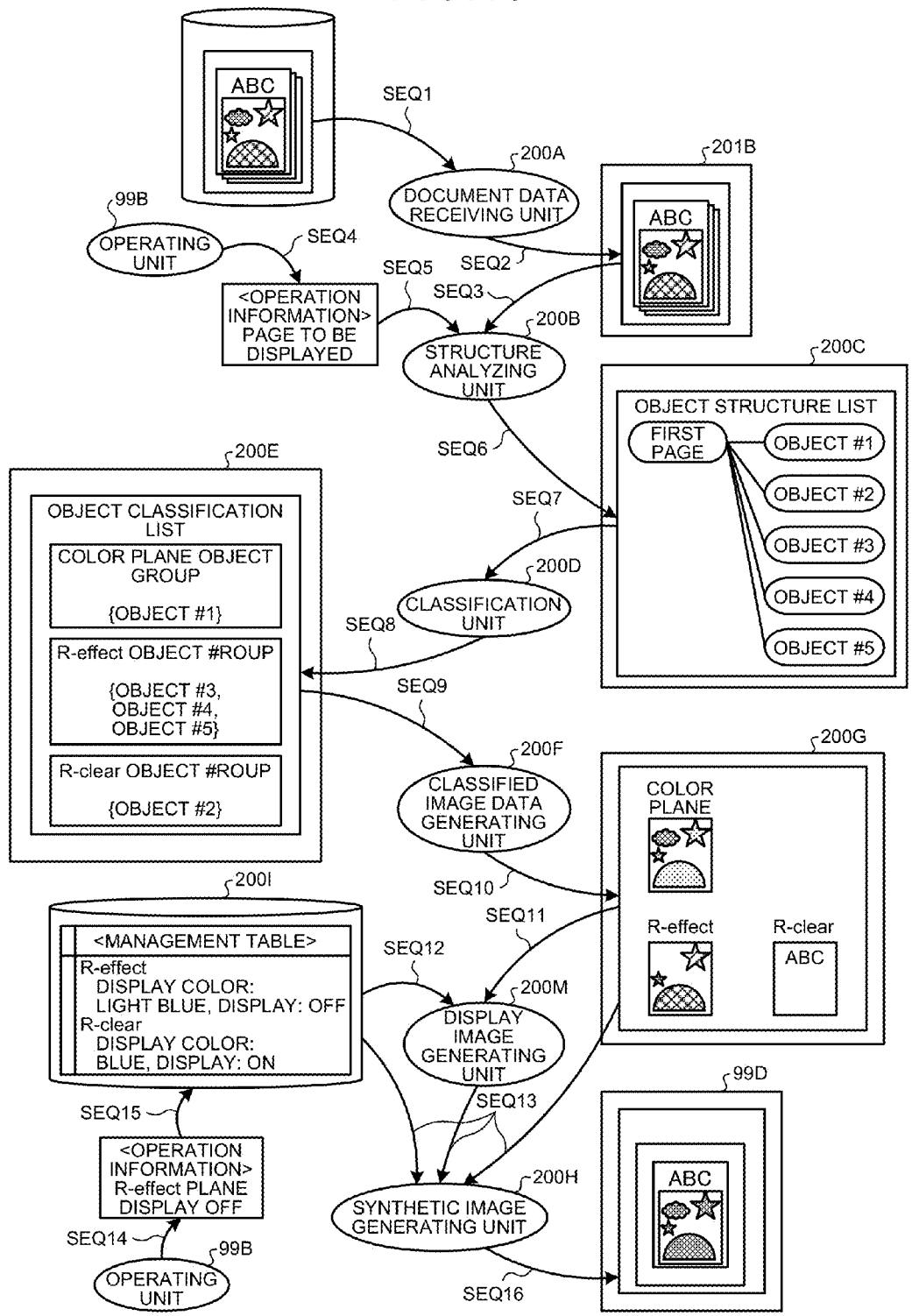
FIG. 13 is a sequence diagram of a process of image display processing performed by a display processing unit according to the first embodiment.

In the object structure list, objects included in a page of the document data are represented by a tree structure (also refer to an object structure list illustrated in the object structure list storage unit 200C in FIG. 13).

The object structure list storage unit 200C stores therein the object structure list, which is a result of analysis of the document data performed by the structure analyzing unit 200B.

The classification unit 200D classifies each object (drawing area) in the object structure list into a drawing area group of color images specified by the first color plane image data, a drawing area group of transparent images specified by the first clear plane image data, and a drawing area group specified by the first gloss-control plane image data, and generates an object classification list. The object classification list is a list of pointers from each object group to corresponding objects stored in the object structure list storage unit 200C, and actual drawing information is stored in the object structure list storage unit 200C. The classification list storage unit 200E stores therein the object classification list (also refer to the object classification list illustrated in the classification list storage unit 200E in FIG. 13. In FIG. 13, the drawing area group of color images specified by the first color plane image data is denoted as a color plane object group, the drawing area group of transparent images specified by the first clear plane image data is denoted as an R-clear object group, and the drawing area group of glossy areas specified by the first gloss-control plane image data is denoted as an R-effect object group).

Based on the document data, more specifically, on the object structure list and the object classification list, the classified image data generating unit 200F generates second color plane image data, second clear plane image data, and second gloss-control plane image data as image data to be displayed.

The second color plane image data is image data to be displayed in a displayable format on the display unit 99D converted from the first color plane image data. The second color plane image data is image data in a raster format expressed by 8 bits per one pixel, for example, converted from the first color plane image data.

The classified image data generating unit 200F reads drawing information of drawing areas corresponding to the drawing area group of color images specified by the first color plane image data listed in the object classification list from the object structure list storage unit 200C. The classified image data generating unit 200F then integrates drawing information obtained by converting the drawing information of the drawing area group thus read into a raster format and considers the drawing area group to be a data group on a single page. Subsequently, the classified image data generating unit 200F generates image data based on information, such as the positional relationship and the back-and-forth relationship of the drawing areas included in the drawing area group, thereby generating the second color plane image data.

The second clear plane image data is image data to be displayed in a displayable format on the display unit 99D converted from the first clear plane image data. The second clear plane image data is image data in a raster format expressed by 8 bits per one pixel, for example, converted from the first clear plane image data.

The classified image data generating unit 200F reads drawing information of drawing areas corresponding to the drawing area group of transparent images specified by the first clear plane image data listed in the object classification list from the object structure list storage unit 200C. The classified image data generating unit 200F then integrates drawing information obtained by converting the drawing information of the drawing area group thus read into a raster format and considers the drawing area group to be a data group on a single page. Subsequently, the classified image data generating unit 200F generates image data based on information, such as the positional relationship and the back-and-forth relationship of the drawing areas included in the drawing area group, thereby generating the second clear plane image data.

The second gloss-control plane image data is image data to be displayed in a displayable format on the display unit 99D converted from the first gloss-control plane image data. The second gloss-control plane image data is image data in a raster format expressed by 8 bits per one pixel, for example, converted from the first gloss-control plane image data.

The classified image data generating unit 200F reads drawing information of drawing areas corresponding to the drawing area group of glossy areas specified by the first gloss-control plane image data listed in the object classification list from the object structure list storage unit 200C. The classified image data generating unit 200F then integrates drawing information obtained by converting the drawing information of the drawing area group thus read into a raster format and considers the drawing area group to be a data group on a single page. Subsequently, the classified image data generating unit 200F generates image data based on information, such as the positional relationship and the back-and-forth relationship of the drawing areas included in the drawing area group, thereby generating the second gloss-control plane image data.

The classified image data storage unit 200G stores therein the second color plane image data, the second gloss-control plane image data, and the second clear plane image data generated by the classified image data generating unit 200F.

The display management information storage unit 200I stores therein a management table. The management table stores therein display management information corresponding to the glossy area and display management information corresponding to the transparent image.

The display management information includes display information, display color information, and transparency information. The display information is information indicating whether to display each of the glossy area and the transparent image on the display unit 99D. The display color information is information indicating a display color of each of the glossy area and the transparent image being displayed on the display unit 99D. The transparency information is information indicating the transparency of the display color of each of the glossy area and the transparent image being displayed on the display unit 99D.

While an explanation will be made of the case where the display management information includes the display information, the display color information, and the transparency information in the present embodiment, the display management information only needs to include at least the display information and the display color information.

The receiving unit 200K receives the display management information including the display information, the display color information, and the transparency information from the operating unit 99B, and stores the display management information in the management table of the display management information storage unit 200I. The display information, the display color information, and the transparency information are input by an operation instruction issued by the user through the operating unit 99B.

Input screen information indicating an input screen to be displayed on the display unit 99D used for setting the display information and the display color information is stored in advance in the display management information storage unit 200I, for example. Subsequently, with an operation on the operating unit 99B performed by the user, a signal indicating the start of setting of the display information and the display color information and a signal indicating the start of display processing are input to the display processing unit 15. As a result, the display control unit 200J displays the input screen of the input screen information stored in the display management information storage unit 200I on the display unit 99D. The receiving unit 200K then stores various types of information set by an operation instruction issued by the user through the operating unit 99B in the management table.

Figure 12A:
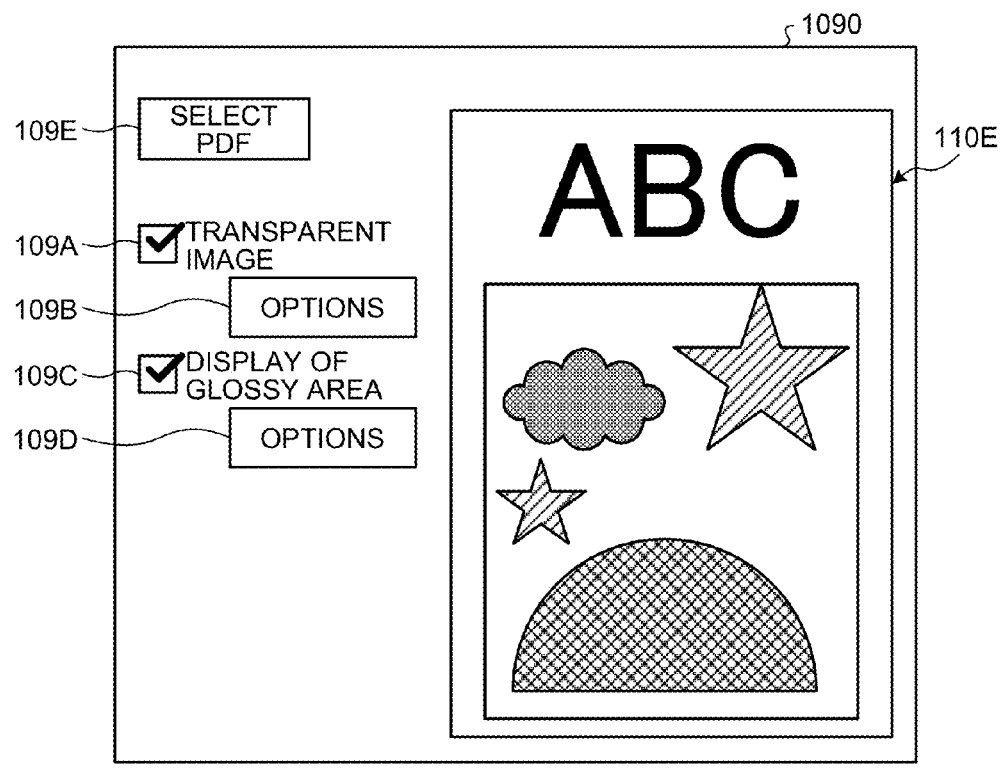
FIGS. 12A, 12B, and 12C illustrate examples of an input screen.

An input screen 1090 illustrated in FIG. 12A is displayed on the display unit 99D, for example. The input screen 1090 includes a PDF selection button 109E used for specifying document data to be displayed as a preview and a check box 109A used for selecting whether to display a transparent image. The input screen 1090 further includes a switching button 109B used for instructing to switch the screen to a detailed information input screen for inputting a display color and transparency of a transparent image, for example. The input screen 1090 further includes a check box 109C used for selecting whether to display a glossy area to which a surface effect is to be applied. The input screen 1090 further includes a switching button 109D used for instructing to switch the screen to a detailed information input screen for inputting a display color of a glossy area to which a surface effect is to be applied and transparency of the glossy area, for example.

The input screen 1090 further includes a display screen 110E that displays a document image and a preview image of document data to be displayed as a preview.

An assumption is made that a check mark is placed in the check box 109A used for selecting whether to display a transparent image on the input screen 1090. In this case, the receiving unit 200K stores display-ON information indicating that a transparent image is displayed as display information in the management table in a manner associated with the information indicating the transparent image.

Figure 12B:
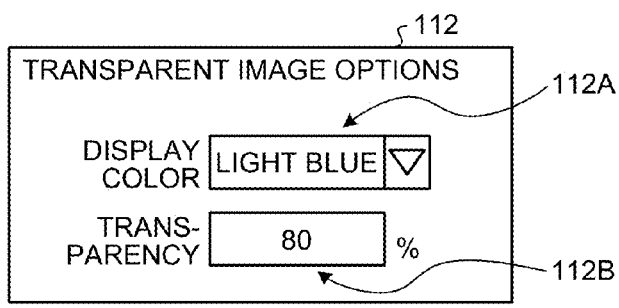

If the switching button 109B is operated by an instruction issued by the user through the operating unit 99B, the display unit 99D displays an input screen 112 for inputting detailed information (options) on display of the transparent image (refer to FIG. 12B).

The input screen 112 includes a display color setting field 112A used for setting a display color that is a color of a transparent image when being displayed and a transparency setting field 112B used for setting transparency of a transparent image when being displayed. By operating a pull-down button of the display color setting field 112A with an operation performed by the user on the operating unit 99B, the user can select a display color. In terms of the transparency, the user can also input arbitrary transparency.

In the example illustrated in FIG. 12B, light blue is set as the display color of the transparent image when being displayed, and 80% is set as the transparency of the transparent image when being displayed.

In this case, the receiving unit 200K stores information indicating "light blue" in the management table in a manner associated with the information indicating the transparent image as color information indicating the display color of the transparent image when being displayed. Furthermore, the receiving unit 200K stores information indicating "80%" in the management table in a manner associated with the information indicating the transparent image as transparency information indicating the transparency of the transparent image when being displayed.

An assumption is made that a check mark is placed in the check box 109C used for selecting whether to display a glossy area to which a surface effect is to be applied on the input screen 1090. In this case, the receiving unit 200K stores display-ON information indicating that a glossy area is displayed as display information in the management table in a manner associated with the information indicating the glossy area. If the switching button 109D is operated by an instruction issued by the user through the operating unit 99B, the display unit 99D displays an input screen 114 for inputting detailed information (options) on display of the glossy area to which the surface effect is to be applied (refer to FIG. 12C).

The input screen 114 includes a display color setting field 114A used for setting a display color that is a color of a glossy area when being displayed and a transparency setting field 114B used for setting transparency of the glossy area when being displayed. By operating a pull-down button of the display color setting field 114A with an operation performed on the operating unit 99B, the user can select a display color. In terms of the transparency, the user can also input arbitrary transparency.

The transparency is specified by an integer value from 0 to 100. Transparency of 0% means solid. Transparency of 100% means colorless, and a background color can be seen completely.

Figure 12C:
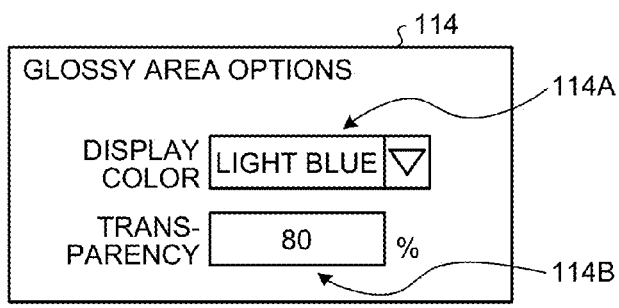

In the example illustrated in FIG. 12C, light blue is set as the display color of the glossy area to which the surface effect is to be applied when being displayed, and 80% is set as the transparency of the glossy area when being displayed.

In this case, the receiving unit 200K stores information indicating "light blue" in the management table in a manner associated with the information indicating the glossy area as display color information indicating the display color of the glossy area to which the surface effect is to be applied when being displayed. Furthermore, the receiving unit 200K stores information indicating "80%" in the management table in a manner associated with the information indicating the glossy area as transparency information indicating the transparency of the area to which the surface effect is to be applied when being displayed.

By contrast, an assumption is made that the check mark is taken off the check box 109A used for selecting whether to display a transparent image on the input screen 1090 by an operation instruction issued by the user through the operating unit 99B. In this case, the receiving unit 200K stores display-OFF information indicating that no transparent image is displayed in the management table in a manner associated with the information indicating the transparent image.

Similarly, an assumption is made that the check mark is taken off the check box 109C used for selecting whether to display an area to which a surface effect is to be applied on the input screen 1090 by an operation instruction issued by the user through the operating unit 99B. In this case, the receiving unit 200K stores display-OFF information indicating that no glossy area is displayed in the management table in a manner associated with the information indicating the glossy area.

Referring back to FIG. 2, the explanation will be continued.

The color of the glossy area and the transparent image printed on a recording medium using clear toner is colorless and transparent. For this reason, the display image generating unit 200M converts the color and the transparency of the glossy area of the second gloss-control plane image data stored in the classified image data storage unit 200G into the display color of the display color information (first display color information) and the transparency of the transparency information corresponding to the glossy area stored in the display management information storage unit 200I, respectively, thereby generating third gloss-control plane image data.

Similarly, the display image generating unit 200M converts the color and the transparency of the transparent image of the second clear plane image data stored in the classified image data storage unit 200G into the display color of the display color information (second display color information) and the transparency of the transparency information corresponding to the transparent image stored in the display management information storage unit 200I, respectively, thereby generating third clear plane image data.

The synthetic image generating unit 200H synthesizes at least one of the third gloss-control plane image data and the third clear plane image data generated by the display image generating unit 200M and the second color plane image data stored in the classified image data storage unit 200G to generate a synthetic image indicating a preview image obtained by estimating a printing result of the document data.

Specifically, the synthetic image generating unit 200H reads the management table stored in the display management information storage unit 200I and reads at least one of a glossy area and a transparent image associated with the display information indicating display-ON between the glossy area and the transparent image. If the display information of the glossy area indicates display-ON, the synthetic image generating unit 200H reads the third gloss-control plane image data from the display image generating unit 200M. By contrast, if the display state of the transparent image indicates display-ON, the synthetic image generating unit 200H reads the third clear plane image data from the display image generating unit 200M.

The synthetic image generating unit 200H then synthesizes the second color plane image data and at least one of the third gloss-control plane image data and the third clear plane image data thus read to generate a synthetic image.

The display control unit 200J displays the synthetic image generated by the synthetic image generating unit 200H on the display unit 99D.

The image display processing performed by the display processing unit 15 will now be described.

FIG. 13 is a sequence diagram of a process of the image display processing performed by the display processing unit 15. FIG. 13 is a sequence diagram of a process of the image display processing until the synthetic image obtained by estimating a printing result of the document data illustrated in FIG. 11 is displayed on the display unit 99D.

The display processing unit 15 displays the input screen 1090 illustrated in FIG. 12A on the display unit 99D. The user then issues an operation instruction through the operating unit 99B, thereby operating the PDF selection button 109E used for issuing a selection instruction of document data to be displayed. If the document data serving as a preview target is selected, the document data receiving unit 200A reads the document data thus specified and loads the document data on the primary memory 201B (SEQ1 and SEQ2).

Subsequently, if a page to be displayed is selected by an operation instruction issued by the user through the operating unit 99B (SEQ4), the structure analyzing unit 200B reads document data of the page corresponding to the selection result from the primary memory 201B and analyzes the document data (SEQ3 and SEQ5).

The structure analyzing unit 200B then stores an object structure list, which is the analysis result, in the object structure list storage unit 200C (SEQ6).

The classification unit 200D classifies the object #1 to the object #5 listed in the object structure list stored in the object structure list storage unit 200C into three object groups of a drawing area group of color images specified by the first color plane image data, a drawing area group of transparent images specified by the first clear plane image data, and a drawing area group of glossy areas specified by the first gloss-control plane image data to generate an object classification list (SEQ7 and SEQ8).

The classified image data generating unit 200F integrates and rasterizes the drawing area group of color images listed in the object classification list to generate the second color plane image data. The classified image data generating unit 200F integrates and rasterizes the drawing area group of transparent images listed in the object classification list to generate the second clear plane image data. The classified image data generating unit 200F integrates and rasterizes the drawing area group of glossy areas to generate the second gloss-control plane image data. Thus, the classified image data generating unit 200F generates the second color plane image data, the second gloss-control plane image data, and the second clear plane image data (SEQ9 and SEQ10).

The display image generating unit 200M converts the color and the transparency of the glossy area of the second gloss-control plane image data stored in the classified image data storage unit 200G into the display color of the display color information (first display color information) and the transparency of the transparency information corresponding to the glossy area stored in the display management information storage unit 200I, respectively, thereby generating the third gloss-control plane image data. Furthermore, the display image generating unit 200M converts the color and the transparency of the transparent image of the second clear plane image data stored in the classified image data storage unit 200G into the display color of the display color information (second display color information) and the transparency of the transparency information corresponding to the transparent image stored in the display management information storage unit 200I, respectively, thereby generating the third clear plane image data (SEQ11 and SEQ12).

The display management information including the display information, the display color information, and the transparency information received from the operating unit 99B is stored in the management table of the display management information storage unit 200I (SEQ14 and SEQ15).

The synthetic image generating unit 200H synthesizes at least one of the third clear plane image data and the third gloss-control plane image data generated by the display image generating unit 200M and the second color plane image data stored in the classified image data storage unit 200G to generate a synthetic image indicating a preview image obtained by estimating a printing result of the document data (SEQ13).

The synthetic image generated by the synthetic image generating unit 200H is displayed on the display unit 99D by the display control unit 200J, which is not illustrated in FIG. 13 (SEQ16).

The image display processing performed by the display processing unit 15 having the configuration described above according to the present embodiment will now be described.

Figure 14:
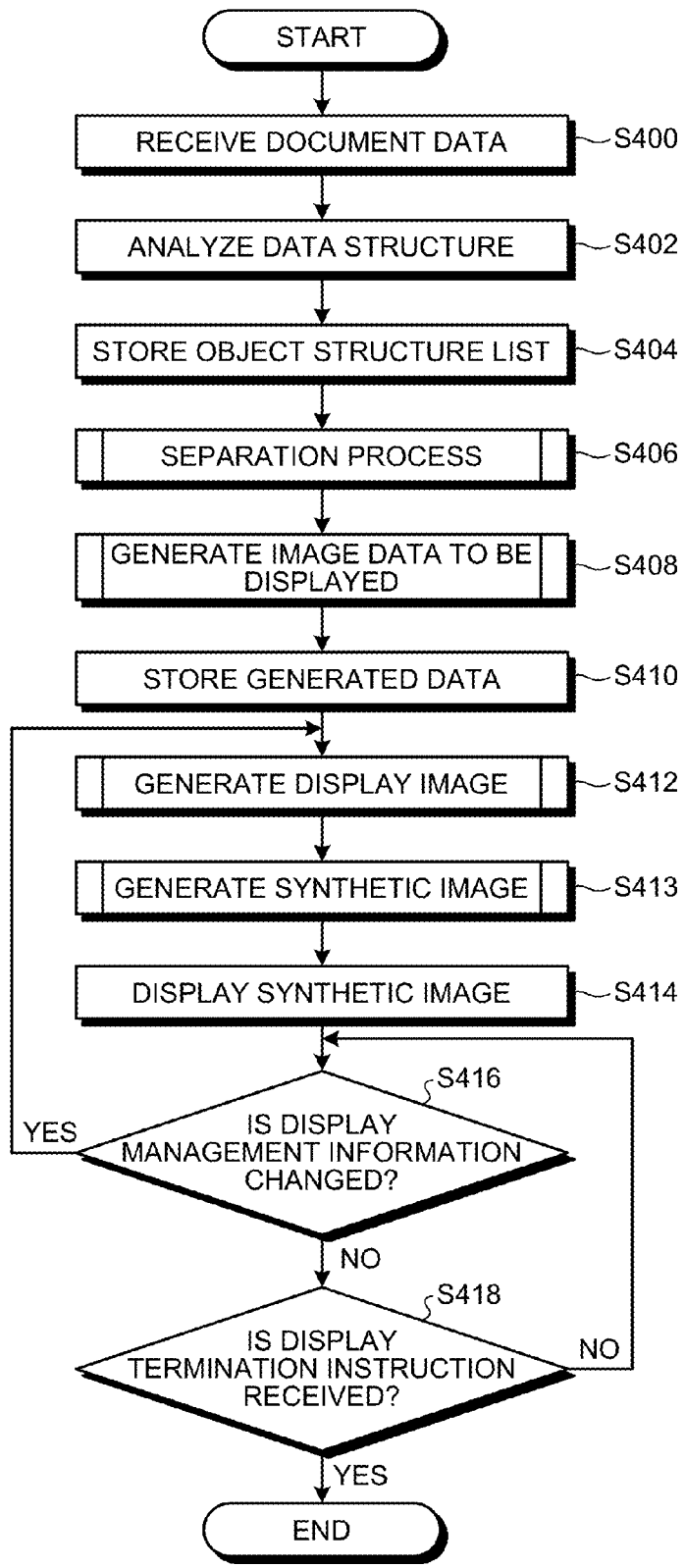
FIG. 14 is a flowchart of a process of the image display processing according to the first embodiment.

FIG. 14 is a flowchart of a process of the image display processing according to the present embodiment.

The document data receiving unit 200A receives document data (Step S400). The document data received by the document data receiving unit 200A is loaded on the primary memory 201B.

The structure analyzing unit 200B analyzes the data structure of the document data loaded on the primary memory 201B and creates an object structure list indicating objects included in each page of the document data (Step S402). The structure analyzing unit 200B then stores the object structure list in the object structure list storage unit 200C (Step S404).

The classification unit 200D performs separation process on the document data to generate an object classification list (Step S406) (which will be described later in detail).

The classified image data generating unit 200F generates the second color plane image data, the second gloss-control plane image data, and the second clear plane image data as image data to be displayed and stores these image data in the classified image data storage unit 200G (Step S408 and Step S410).

The display image generating unit 200M performs display image generation process (Step S412).

The synthetic image generating unit 200H performs synthetic image generation process for generating a synthetic image indicating a preview image obtained by estimating a printing result of the document data (Step S413) (which will be described later in detail).

The display control unit 200J displays the synthetic image generated by the synthetic image generating unit 200H on the display unit 99D (Step S414).

The synthetic image generating unit 200H determines whether the display management information stored in the management table is changed (Step S416). The determination at Step S416 is made as follows. The synthetic image generating unit 200H reads the management table stored in the display management information storage unit 200I, for example. The synthetic image generating unit 200H then determines whether the display management information (the display information, the display color information, and the transparency information) stored in the management table is different from the contents read in the previous generation of the display image (Step S412) and in the previous generation of the synthetic image (Step S413), thereby determining whether the display management information is changed.

If the synthetic image generating unit 200H determines that the display management information is changed (Yes at Step S416), the system control is returned to Step S412. Subsequently, processing at Step S412 and Step S413 is performed using the display management information thus changed.

By contrast, if the synthetic image generating unit 200H determines that the display management information is not changed (No at Step S416), the display processing unit 15 determines whether a signal indicating a display termination instruction is received through the operating unit 99B (Step S418). If a negative determination is made at Step S418 (No at Step S418), the system control is returned to Step S416. By contrast, if an affirmative determination is made at Step S418 (Yes at Step S418), the routine is terminated.

The separation process at Step S406 will now be described.

Figure 15:
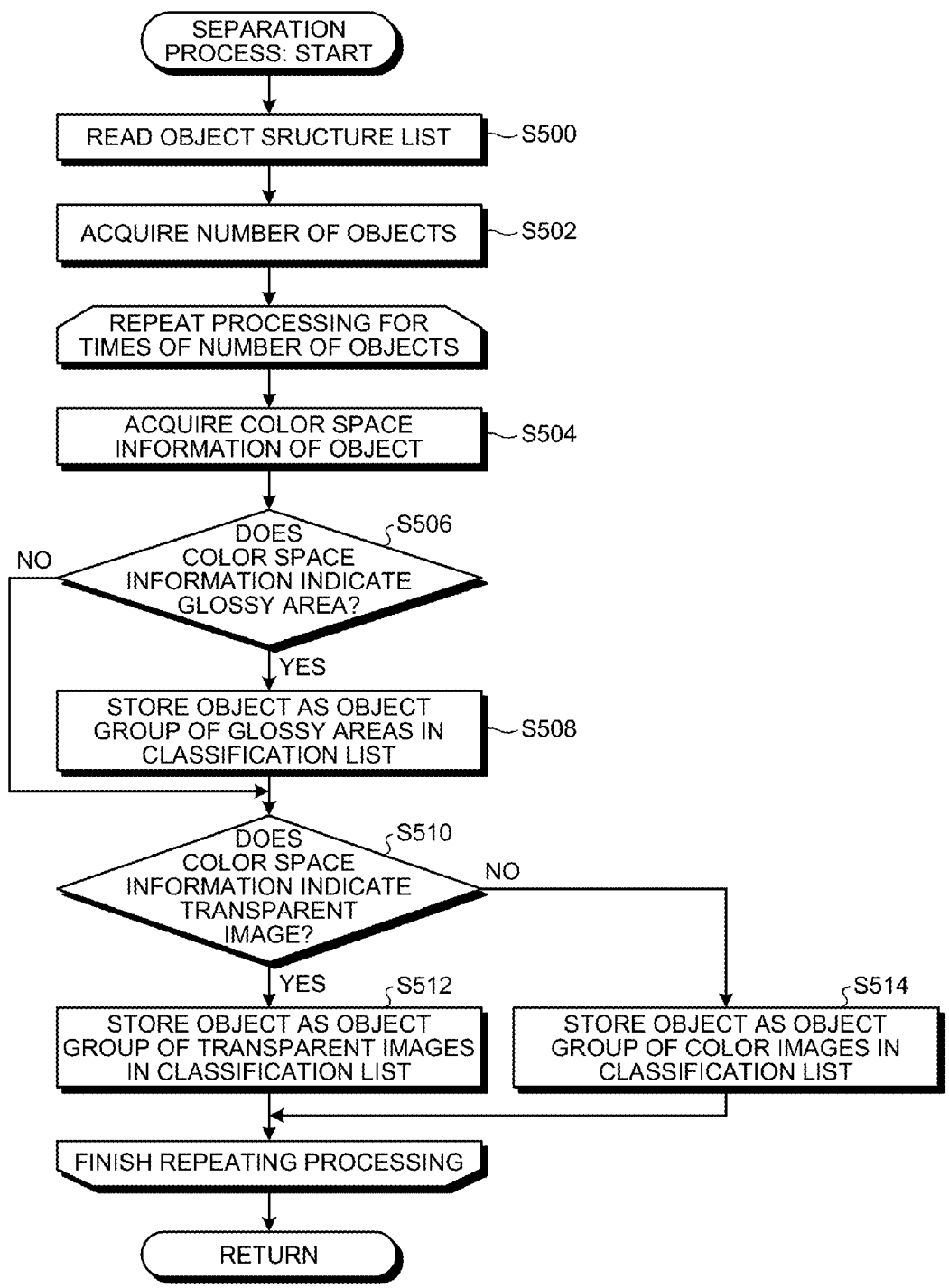
FIG. 15 is a flowchart of separation process according to the first embodiment.

FIG. 15 is a flowchart of a process of the separation process.

The classification unit 200D reads an object structure list from the object structure list storage unit 200C (Step S500).

The classification unit 200D then acquires the number of objects included in the object structure list thus read (Step S502) and repeats processing from Step S506 to Step S512 or to Step S514, which will be described later, for the times of the number of objects.

The classification unit 200D acquires color space information of an object stored in the object structure list storage unit 200C (Step S504).

Subsequently, the classification unit 200D determines whether the color space information acquired at Step S504 is information indicating a glossy area (Step S506). If the color space information acquired at Step S504 is information indicating a glossy area (Yes at Step S506), the classification unit 200D stores the object in the classification list storage unit 200E as an object group of glossy areas (Step S508).

If the processing at Step S508 is completed or if a negative determination is made at Step S506 (No at Step S506), the system control goes to Step S510.

Subsequently, the classification unit 200D determines whether the color space information acquired at Step S504 is information indicating a transparent image (Step S510). If the color space information acquired at Step S504 is information indicating a transparent image (Yes at Step S510), the classification unit 200D stores the object in the classification list storage unit 200E as an object group of transparent images (Step S512).

By contrast, if the color space information acquired at Step S504 is not information indicating a transparent image, that is, if the color space information is information indicating a color image (No at Step S510), the classification unit 200D stores the object in the classification list storage unit 200E as an object group of color images (Step S514).

The display image generation process at Step S412 (refer to FIG. 14) will now be described.

Figure 16:
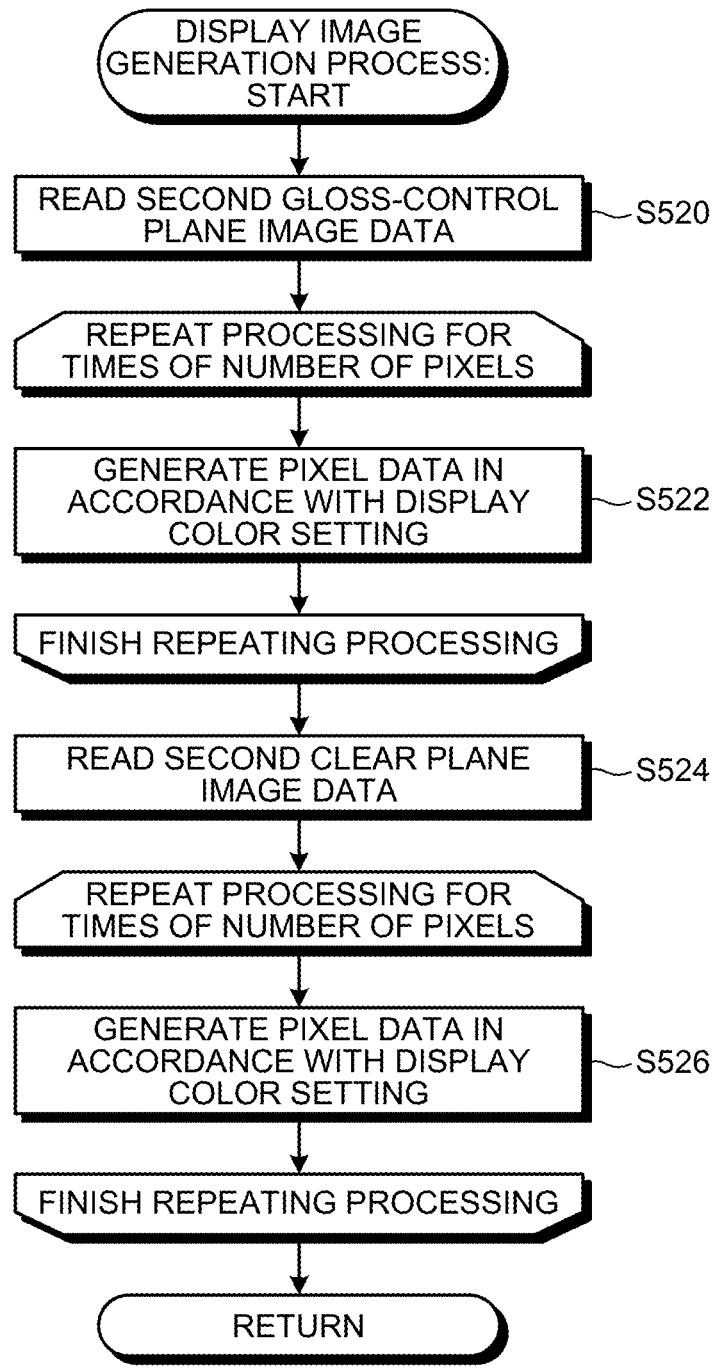
FIG. 16 is a flowchart of display image generation process according to the first embodiment.

FIG. 16 is a flowchart of a process of the display image generation process.

The display image generating unit 200M reads the second gloss-control plane image data from the classified image data storage unit 200G (Step S520). The display image generating unit 200M then repeats processing at Step S522 for the times of the number of pixels in the second gloss-control plane image data.

The display image generating unit 200M generates pixel data of the third gloss-control plane image data in accordance with the display color setting, such as the color information and the transparency information, included in the display management information corresponding to the glossy area stored in the display management information storage unit 200I (Step S522). In more detail, the display image generating unit 200M converts information indicating the color and the density included in pixel data of the second gloss-control plane image data into the color and the density according to the color information and the transparency information included in the display management information corresponding to the glossy area.

By repeating the processing at Step S522 for the times of the number of pixels in the second gloss-control plane image data, the third gloss-control plane image data is generated.

Subsequently, the display image generating unit 200M reads the second clear plane image data from the classified image data storage unit 200G (Step S524). The display image generating unit 200M then repeats processing at Step S526 for the times of the number of pixels in the second clear plane image data.

The display image generating unit 200M generates pixel data of the third clear plane image data in accordance with the display color setting, such as the color information and the transparency information, included in the display management information corresponding to the transparent image stored in the display management information storage unit 200I (Step S526). In more detail, the display image generating unit 200M converts information indicating the color and the density included in pixel data of the second clear plane image data into the color and the density according to the color information and the transparency information included in the display management information corresponding to the transparent image.

By repeating the processing at Step S526 for the times of the number of pixels in the second clear plane image data, the third clear plane image data is generated.

The synthetic image generation process at Step S413 (refer to FIG. 14) will now be described.

Figure 17:
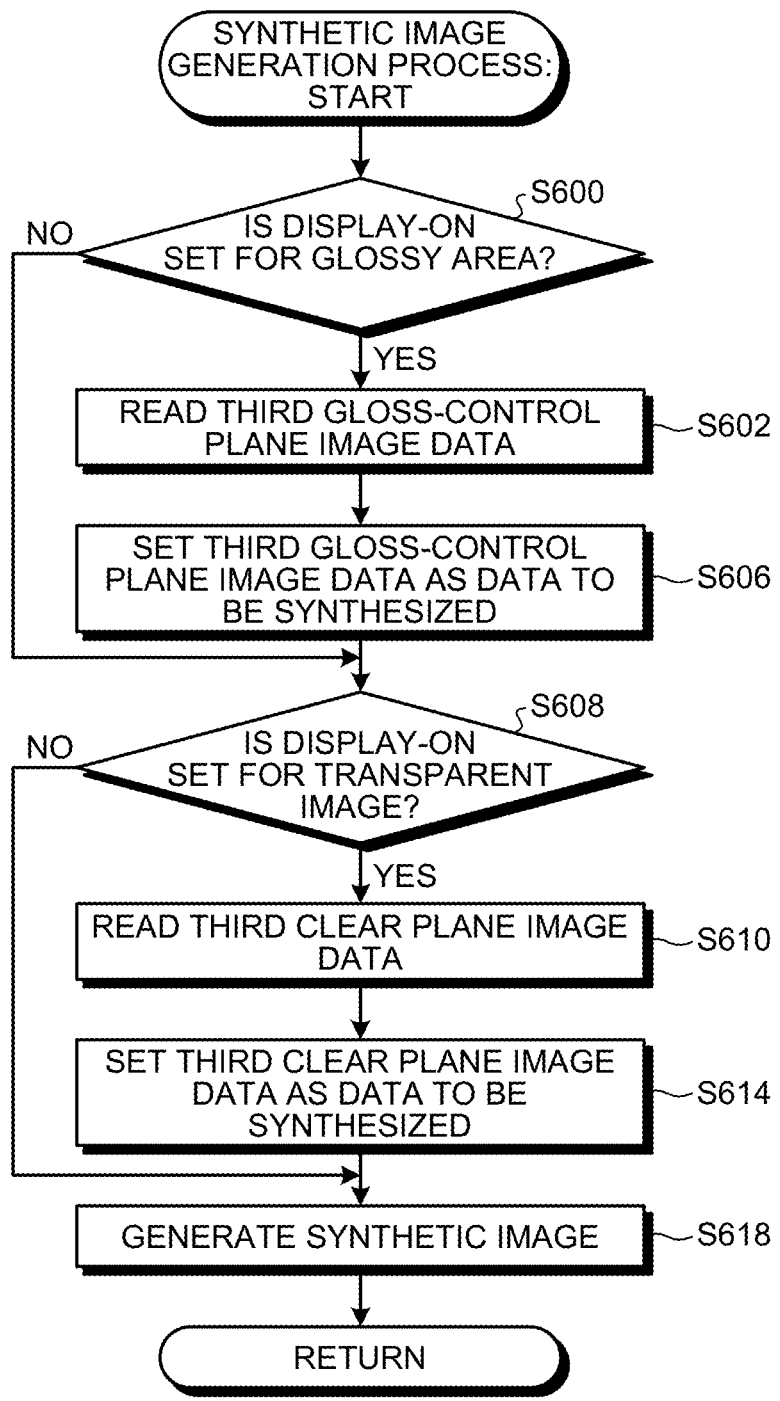
FIG. 17 is a flowchart of synthetic image generation process according to the first embodiment.

FIG. 17 is a flowchart of a process of the synthetic image generation process.

The synthetic image generating unit 200H determines whether display-ON is set for the glossy area (Step S600). The synthetic image generating unit 200H reads the display management information corresponding to the glossy area stored in the management table and determines whether display-ON is set as display information, thereby making the determination at Step S600.

If the display information included in the display management information corresponding to the glossy area indicates display-ON, the synthetic image generating unit 200H makes an affirmative determination (Yes at Step S600), and the system control goes to Step S602. By contrast, if the display information included in the display management information corresponding to the glossy area indicates display-OFF, the synthetic image generating unit 200H makes a negative determination (No at Step S600), and the system control goes to Step S608, which will be described later.

Subsequently, the synthetic image generating unit 200H reads the third gloss-control plane image data from the display image generating unit 200M (Step S602). The synthetic image generating unit 200H then sets the third gloss-control plane image data thus read as data to be synthesized (Step S606).

The synthetic image generating unit 200H determines whether display-ON is set for the transparent image (Step S608). The synthetic image generating unit 200H reads the display management information corresponding to the transparent image stored in the management table and determines whether display-ON is set as display information, thereby making the determination at Step S608.

If the display information included in the display management information corresponding to the transparent image indicates display-ON, the synthetic image generating unit 200H makes an affirmative determination (Yes at Step S608), and the system control goes to Step S610. By contrast, if the display information included in the display management information corresponding to the transparent image indicates display-OFF, the synthetic image generating unit 200H makes a negative determination (No at Step S608), and the system control goes to Step S618, which will be described later.

Subsequently, the synthetic image generating unit 200H reads the third clear plane image data from the display image generating unit 200M (Step S610). The synthetic image generating unit 200H then sets the third clear plane image data thus read as data to be synthesized (Step S614).

The synthetic image generating unit 200H synthesizes the second color plane image data stored in the classified image data storage unit 200G and image data set as the data to be synthesized between the third clear plane image data and the third gloss-control plane image data, thereby generating synthetic image data of a synthetic image (Step S618).

By performing the image display processing described above, the following display image is displayed, for example.

Figure 18:
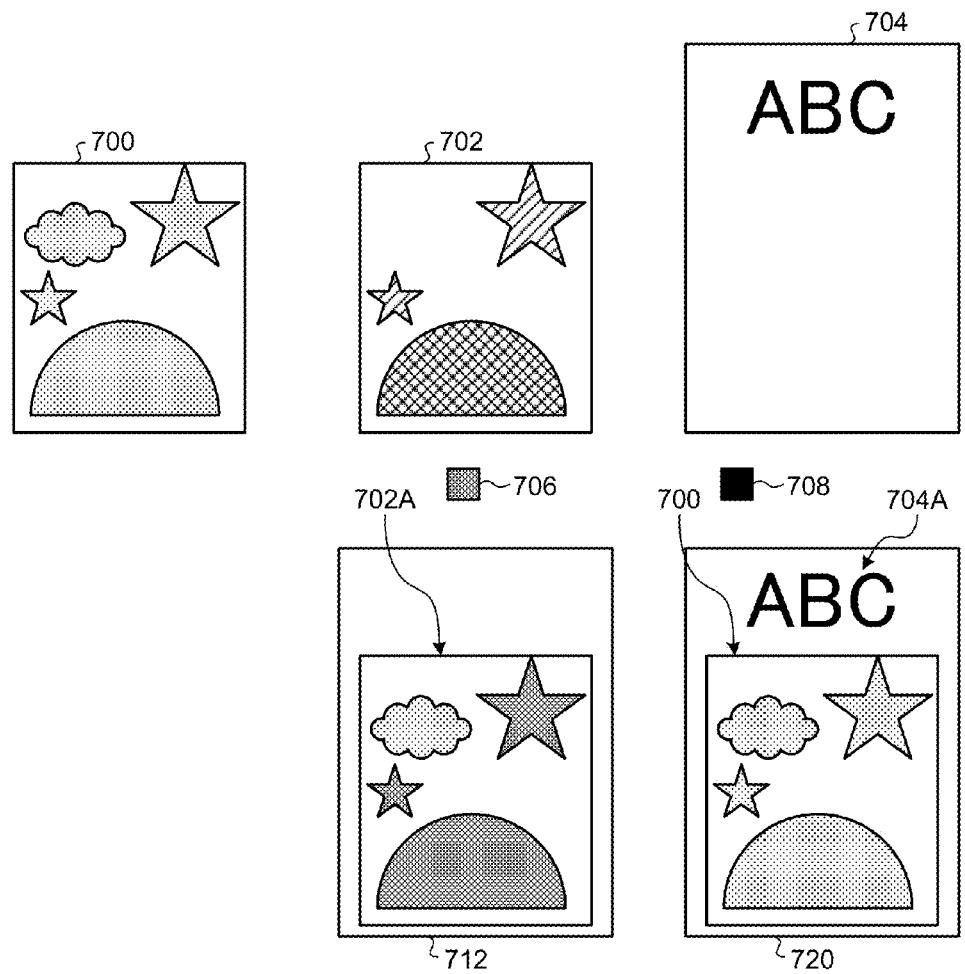
FIG. 18 is a schematic of an example of a synthetic image generated by performing the image display processing according to the first embodiment.

As illustrated in FIG. 18, for example, an assumption is made that second color plane image data 700, second gloss-control plane image data 702, and second clear plane image data 704 are stored in the classified image data storage unit 200G.

Furthermore, an assumption is made that light blue 706 is set as a display color of the glossy area and that red 708 is set as a display color of the transparent image.

An assumption is made that the display information stored in the display management information storage unit 200I indicates that the glossy area is displayed (display-ON) and that the transparent image is not displayed (display-OFF). In this case, the display image generating unit 200M generates third gloss-control plane image data 702A by changing the color of the glossy area in the second gloss-control plane image data 702 into the light blue 706 and third clear plane image data 704A by changing the color of the transparent image in the second clear plane image data 704 into the red 708.

The synthetic image generating unit 200H then synthesizes the third gloss-control plane image data 702A and the second color plane image data 700 to generate synthetic image data 712 of a synthetic image. Therefore, in this case, the display unit 99D displays the synthetic image of the synthetic image data 712.

By contrast, an assumption is made that the display information stored in the display management information storage unit 200I indicates that the glossy area is not displayed (display-OFF) and that the transparent image is displayed (display-ON). In this case, the synthetic image generating unit 200H synthesizes the third clear plane image data 704A and the second color plane image data 700 to generate synthetic image data 720 of a synthetic image. Therefore, in this case, the display unit 99D displays the synthetic image of the synthetic image data 720.

As described above, the display processing unit 15 according to the present embodiment generates the second color plane image data, the second clear plane image data, and the second gloss-control plane image data based on the document data. The display processing unit 15 generates the third clear plane image data and the third gloss-control plane image data by changing the color of the transparent image in the second clear plane image data and the color of the glossy area in the second gloss-control plane image data to the display color thus set. The display processing unit 15 then synthesizes the image data specified to be displayed (display-ON) by the display information between the third clear plane image data and the third gloss-control plane image data and the second color plane image data, thereby generating a synthetic image. The synthetic image is displayed on the display unit 99D.

Therefore, preview display can be switched depending on setting of whether to display the glossy area and setting of whether to display the transparent image made by the user.

Accordingly, the display processing unit 15 according to the present embodiment can switch between the glossy area to which a surface effect is to be applied and the transparent image as preview display.

Furthermore, the display processing unit 15 can specify a display color and transparency when an image is being displayed. Therefore, the display processing unit 15 can display both the drawing area of the color image and the drawing area of the transparent image even if the drawing areas overlap with each other.

Referring back to FIG. 1, the DFE 30, the MIC 40, and the printing apparatus 60 will now be described.

The DFE 30 receives print data from the host device 11 and generates image data for forming a toner image corresponding to each toner of CMYK and colorless (transparent) clear toner based on the print data. The DFE 30 then transmits the image data thus generated to a printer device 50 and a post-processing device 75 via the MIC 40.

The printer device 50 includes at least each toner of CMYK and clear toner, and each toner is provided with an image forming unit including a photosensitive element, a charger, a developing unit, and a photosensitive-element cleaner, and an exposing unit, for example. The printer device 50 irradiates the photosensitive element with a light beam output from the exposing unit in accordance with the image data transmitted from the DFE 30 via the MIC 40. Thus, the printer device 50 forms a toner image corresponding to each toner on the photosensitive element and transfers the toner image onto a recording medium, such as a recording sheet. The toner image thus transferred are heated and pressed at a temperature within a predetermined range (a normal temperature) by a fixing unit, which is not illustrated, and is fixed onto the recording medium. Thus, an image is formed on the recording medium (which will be described later in detail).

In the example of FIG. 1, the post-processing device 75 includes a glosser 70 connected to the printer device 50, a normal fixing post-processing device 80 connected to the glosser 70, and a low-temperature fixing post-processing device 90 connected to the normal fixing post-processing device 80. The glosser 70 is controlled to be turned ON or OFF by the DFE 30. If the glosser 70 is turned ON, the glosser 70 re-fixes the image formed on the recording medium by the printer device 50. As a result, the total amount of adhered toner of each pixel to which toner equal to or larger than a predetermined amount is adhered is uniformly compressed on the whole image formed on the recording medium.

The normal fixing post-processing device 80 includes clear toner and a fixing unit that fixes the clear toner and receives clear toner plane image data, which will be described later, generated by the DFE 30. The normal fixing post-processing device 80 uses the clear toner plane image data thus received to form a toner image with the clear toner in a manner superimposed on the image formed on the recording medium pressed by the glosser 70. Subsequently, the toner image formed on the recording medium is heated and pressed at the normal temperature by the fixing unit and is fixed onto the recording medium.

The low-temperature fixing post-processing device 90 includes clear toner and a fixing unit that fixes the clear toner and receives clear toner plane image data, which will be described later, generated by the DFE 30. The low-temperature fixing post-processing device 90 uses the clear toner plane image data thus received to form a toner image with the clear toner in a manner superimposed on the image formed on the recording medium pressed by the glosser 70 and the normal fixing post-processing device 80. Subsequently, the toner image formed on the recording medium is heated and pressed at a temperature (a low temperature) lower than the normal temperature by the fixing unit and is fixed onto the recording medium.

Figure 19:
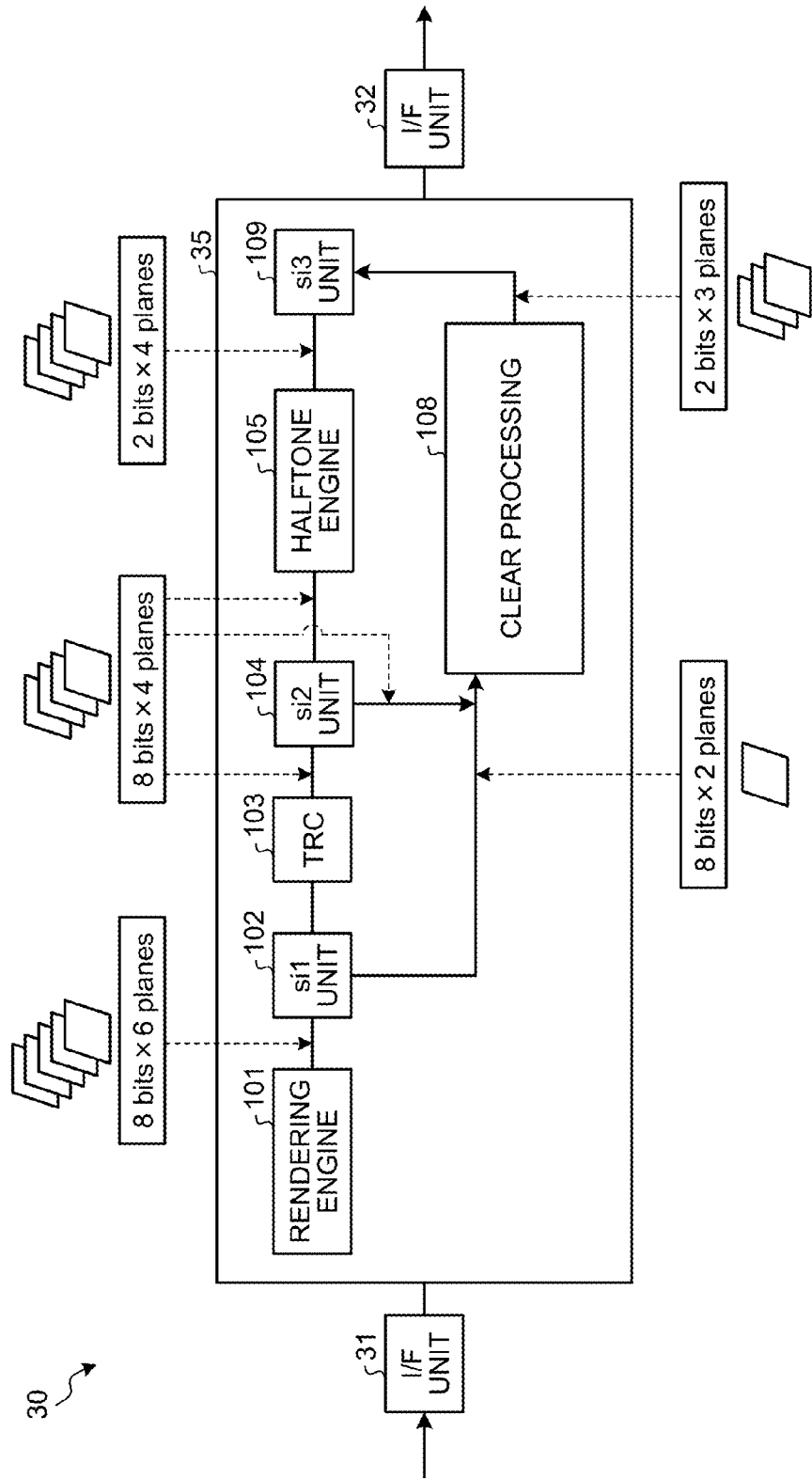
FIG. 19 is a block diagram of an exemplary configuration of a DFE according to the first embodiment.

The functional configuration of the DFE 30 will now be described. FIG. 19 is a block diagram of an exemplary schematic configuration of the DFE 30. As illustrated in FIG. 19, the DFE 30 includes an interface (I/F) unit 31, an I/F unit 32, and a control unit 35. The I/F unit 31 is an interface device that communicates with the host device 11. The I/F unit 32 is an interface device that communicates with the MIC 40.

The control unit 35 is a unit that controls the DFE 30 collectively and is a computer including a CPU, a ROM, and a RAM, for example. As illustrated in FIG. 19, functions provided to the control unit 35 include a rendering engine 101, an si1 unit 102, a tone reproduction curve (TRC) 103, an si2 unit 104, a halftone engine 105, a clear processing 108, an si3 unit 109, and a surface effect selection table (not illustrated), for example. The rendering engine 101, the si1 unit 102, the TRC 103, the si2 unit 104, the halftone engine 105, the clear processing 108, and the si3 unit 109 are realized by the control unit 35 of the DFE 30 executing various types of computer programs stored in a main storage unit or an auxiliary storage unit. The si1 unit 102, the si2 unit 104, and the si3 unit 109 have separation function to separate image data and integration function to integrate image data. The surface effect selection table is stored in the auxiliary storage unit, for example.

The rendering engine 101 receives print data from the host device 11. The rendering engine 101 interprets the language of the print data thus received and converts each of the first color plane image data, the first clear plane image data, and the first gloss-control plane image data expressed in a vector format into image data expressed in a raster format. In addition, the rendering engine 101 converts a color space expressed in an RGB format into a color space of CMYK, for example, to output fourth color plane image data, fourth gloss-control plane image data, and fourth clear plane image data of CMYK. The fourth color plane image data, the fourth gloss-control plane image data, and the fourth clear plane image data are image data in which one pixel is expressed by 8 bits, for example. Furthermore, the fourth clear plane image data and the fourth gloss-control plane image data are represented by density values within a range from 0 to 255 (from 0% to 98%) by 8 bits per one pixel, for example. In other words, the rendering engine 101 converts each of the first color plane image data, the first clear plane image data, and the first gloss-control plane image data included in the print data output from the host device 11 and expressed in a vector format into image data expressed in a raster format. As a result, the DFE 30 sets the type of surface effect to be applied to a drawing area specified by the user as a density value in units of pixels.

The si1 unit 102 outputs the fourth color plane image data to the TRC 103. Furthermore, the si1 unit 102 outputs the fourth gloss-control plane image data and the fourth clear plane image data to the clear processing 108.

The TRC 103 receives the fourth color plane image data via the si1 unit 102. The TRC 103 performs gamma correction on the fourth color plane image data thus received using a gamma curve of one-dimensional lookup table (1D_LUT) generated by calibration. While the image processing includes control on the total amount toner besides the gamma correction, for example, the explanation thereof is omitted in the present embodiment. The si2 unit 104 outputs the fourth color plane image data on which gamma correction is performed by the TRC 103 to the clear processing 108 as data used for generating an inverse mask. The halftone engine 105 receives the fourth color plane image data on which gamma correction is performed via the si2 unit 104. To output the fourth color plane image data thus received to the printing apparatus 60, the halftone engine 105 performs halftone processing for converting the fourth color plane image data into image data in a data format of CMYK each expressed by 2 bits, for example. The halftone engine 105 then outputs fifth color plane image data, which is 2-bit image data of CMYK on which the halftone processing is performed, for example, to the si3 unit 109. Note that 2 bits are given just as an example, and the number of bits is not limited thereto.

The clear processing 108 refers to the surface effect selection table corresponding to surface information and the device configuration to determine whether to turn on or off the glosser 70. In addition, the clear processing 108 uses the fourth gloss-control plane image data and the fourth clear plane image data to generate 2-bit clear toner plane image data, which will be described later, to which the clear toner is adhered, for example. Note that 2 bits are given just as an example, and the number of bits is not limited thereto.

In more detail, the surface effect selection table stores therein the density value of the gloss-control plane image data represented within a range from 0% to 98%, the density value of the gloss-control plane image data represented by 256 levels from 0 to 255, the type of surface effect, ON-OFF information specifying whether to turn on or off the glosser 70, methods for determining the density value of the clear toner plane image data, and the type of practicable surface effect in a manner associated with one another. The surface effect selection table is determined in a manner associated with device configuration information and information indicating whether to turn ON or OFF the glosser 70.

FIG. 20 is a schematic of an example of the surface effect selection table. The contents of the surface effect selection table are determined based on the device configuration information and priority information. The device configuration information is information indicating the configuration of the post-processing device 75 provided to the printing apparatus 60. The priority information is information indicating either "gloss priority" or "type priority". The "gloss priority" means replacing a surface effect specified by the user with a surface effect having higher glossiness. The "type priority" means replacing a surface effect specified by the user with a surface effect not including "PG" having the highest glossiness. While the density value in the surface effect selection table is represented as a value falling within a range in FIG. 20, the density value corresponding to each type of surface effect is set to a value equal to the value in the correspondence relationship between the density value and the type of surface effect specified in the density value selection table illustrated in FIG. 10.

The clear processing 108 reads the surface effect selection table corresponding to the device configuration information and the priority information from a storage unit, which is not illustrated. The clear processing 108 reads the surface effect selection table illustrated in FIG. 20, for example. The priority information is information indicating either the gloss priority or the type priority and is specified by an operation instruction issued by the user, for example. The device configuration information is information indicating the type of the post-processing device 75 provided to the printing apparatus 60.

If the priority information indicates the gloss priority, the clear processing 108 determines to turn ON the glosser 70. By contrast, if the priority information indicates the type priority, the clear processing 108 determines to turn OFF the glosser 70.

The clear processing 108 then converts 8-bit image data into 2-bit image data for a pixel in each pixel position, for example. In more detail, if a transparent image and a glossy area to which a surface effect is to be applied overlap with each other in a pixel to be converted, the clear processing 108 excludes one of them in units of pixels in accordance with priority setting separately set in advance.

Specifically, for a pixel position at which a transparent image and a glossy area overlap with each other, if the priority setting indicates the gloss priority, the clear processing 108 converts 8-bit image data at the corresponding pixel position in the fourth clear plane image data into 2-bit image data. By contrast, for a pixel position in which a transparent image and a glossy area overlap with each other, if the priority setting indicates the type priority, the clear processing 108 converts 8-bit image data at the corresponding pixel position in the fourth gloss-control plane image data into 2-bit image data.

The clear processing 108 then uses the surface effect selection table corresponding to turning ON or OFF of the glosser 70 determined based on the priority information and the device configuration information to generate 2-bit first clear toner plane image data Clr-1, 2-bit second clear toner plane image data Clr-2, and 2-bit third clear toner plane image data Clr-3 from the fourth gloss-control plane image data and the fourth clear plane image data.

The first clear toner plane image data Clr-1 is image data used by the printer device 50 in printing with clear toner. The second clear toner plane image data Clr-2 is image data used by the normal fixing post-processing device 80 in printing with clear toner. The third clear toner plane image data Clr-3 is image data used by the low-temperature fixing post-processing device 90 in printing with clear toner.

The clear processing 108 then outputs ON-OFF instruction information instructing to turn on or off the glosser 70 and the 2-bit clear toner plane image data (Clr-1 to Clr-3) to the si3 unit 109.

In the example of FIG. 20, if the density value of a pixel included in the fourth gloss-control plane image data falls within a range from 238 to 255 (from 94% to 98%), the type of surface effect corresponding to the density value of the pixel is "PG", and the ON-OFF information indicates "ON". In the case where the surface effect is "PG", image data input to the first clear toner plane image data Clr-1 is an inverse mask 1. Furthermore, in the case of "PG", image data input to the second clear toner plane image data Clr-2 and Clr-3 is no data (no data).

Similarly, if the density value of a pixel included in the fourth gloss-control plane image data falls within a range from 212 to 232 (from 84% to 90%), the type of surface effect corresponding to the density value of the pixel is "G", and the ON-OFF information indicates "ON". In the case where the surface effect is "G", image data input to the first clear toner plane image data Clr-1 is an inverse mask m. Furthermore, in the case of "G", image data input to the second clear toner plane image data Clr-2 is solid, and image data input to Clr-3 is no data (no image data).

Similarly, if the density value of a pixel included in the fourth gloss-control plane image data falls within a range from 23 to 43 (from 10% to 16%), the type of surface effect corresponding to the density value of the pixel is "M", and the ON-OFF information indicates "ON". In the case of "M", image data input to the first clear toner plane image data Clr-1 and Clr-3 is no data (no image data).

Furthermore, if the surface effect is "M", image data input to the second clear toner plane image data Clr-2 is halftone-n.

Similarly, if the density value of a pixel included in the fourth gloss-control plane image data falls within a from between 1 to 17 (from 0% to 6%), the type of surface effect corresponding to the density value of the pixel is "PM", and the ON-OFF information indicates "ON". In the case of "PM", image data input to the first clear toner plane image data Clr-1 and Clr-2 is no data (no image data).

Furthermore, if the surface effect is "PM", image data input to the third clear toner plane image data Clr-3 is solid.

The inverse mask makes the total amount of adhered CMYK toner and clear toner uniform on pixels constituting an area to which the surface effect is to be applied. Specifically, image data obtained by adding all the density values of the pixels constituting the target area in CMYK plane image data and subtracting the additional value from a predetermined value serves as the inverse mask. More specifically, for example, the inverse mask is expressed by Equation (1):

$$Clr=100-(C+M+Y+K) \quad (1)$$

in the case of Clr<0, Clr=0 is satisfied.

In Equation (1), Clr, C, M, Y, and K represent the density ratio converted from the density value of each pixel for clear toner and each toner of C, M, Y, and K, respectively. In other words, by using Equation (1), the total amount of adhered toner obtained by adding the amount of adhered clear toner to the total amount of adhered toner of C, M, Y, and K is made 100% for all the pixels constituting the area to which the surface effect is to be applied. If the total amount of adhered toner of C, M, Y, and K is equal to or larger than 100%, no clear toner is adhered, and the density ratio thereof is made 0%. This is because the part in which the total amount of adhered toner of C, M, Y, and K exceeds 100% is made smooth by fixing processing. By making the total adhesion amount on all the pixels constituting the area to which the surface effect is to be applied equal to or larger than 100% in this manner, it is possible to eliminate unevenness on the surface caused by difference between the total amounts of adhesive toner in the target area. As a result, gloss is generated by specular reflection of light. However, some inverse masks are calculated by Equation other than Equation (1), and a plurality of types of inverse masks can be present.

A solid mask causes clear toner to uniformly adhere to the pixels constituting the area to which the surface effect is to be applied. Specifically, for example, the solid mask is expressed by Equation (2):

$$Clr=100 \quad (2)$$

Some pixels to which the surface effect is to be applied may be associated with a density ratio other than 100%, and a plurality of types of solid masks can be present.

Alternatively, the inverse mask may be calculated by multiplication of the background exposure rate of each color, for example. In this case, for example, the inverse mask is expressed by Equation (3):

$$Clr=100\times\{(100-C)/100\}\times\{(100-M)/100\}\times\{(100-Y)/100\}\times\{(100-K)/100\} \quad (3)$$

In Equation (3), (100−C)/100 represents the background exposure rate of C, (100−M)/100 represents the background exposure rate of M, (100−Y)/100 represents the background exposure rate of Y, and (100−K)/100 represents the background exposure rate of K.

Alternatively, the inverse mask may be calculated by a method assuming that the halftone dot having the largest area ratio achieves the smoothness. In this case, for example, the inverse mask is expressed by Equation (4):

$$Clr=100-\max(C,M,Y,K) \quad (4)$$

In Equation (4), max(C, M, Y, K) indicates that the density value of a color having the largest density value among CMYK is a representative value.

In other words, the inverse mask may be expressed by any one of Equation (1) to Equation (4).

In the example of FIG. 20, if the density value of a pixel included in the fourth gloss-control plane image data falls within a range from 212 to 232 (from 84% to 90%), the type of surface effect corresponding to the density value of the pixel is G, and the ON-OFF information indicates "ON". In this case, the density value of the pixel in the first clear toner plane image data Clr-1 is calculated by the "inverse mask m" and is expressed by 8 bits, the density value of the pixel in the second clear toner plane image data Clr-2 is calculated by the "solid" and is expressed by 2 bits, and the density value of the pixel in the third clear toner plane image data Clr-3 is not present ("no data"). Furthermore, the type of practicable surface effect is "G". The inverse mask m is expressed by an equation different from Equation (1) (by any one of Equation (2) to Equation (4)). This is because the total amount of adhered toner to be smoothed is different from that in the case of "PG". The solid mask causes clear toner to uniformly adhere to the pixels constituting the area to which the surface effect is to be applied. Specifically, for example, the solid mask is expressed by Equation (2). Some pixels to which the surface effect is to be applied may be associated with a density ratio other than 100%, and a plurality of types of solid masks can be present.

In the example of FIG. 20, if the density value of a pixel included in the fourth gloss-control plane image data falls within a range from 23 to 43 (from 10% to 16%), the type of surface effect corresponding to the density value of the pixel is "M", and the ON-OFF information indicates "ON". In this case, the density value of the pixel in the first clear toner plane image data Clr-1 is not present ("no data"), the density value of the pixel in the second clear toner plane image data Clr-2 is calculated by the "halftone-n" and is expressed by 2 bits, and the density value of the pixel in the third clear toner plane image data Clr-3 is not present ("no data"). Furthermore, the type of practicable surface effect is "M". The halftone reduces the glossiness by performing halftone processing on the clear toner and making the surface uneven to reflect light diffusely. A plurality of types of halftone processing are present, and the halftone-n is given as one of the types of halftone processing. In the present embodiment, if "M" is specified as the type of surface effect, the density values of pixels in the area where "M" is specified in the gloss-control plane image data are commonly set to a value within a range from 23 to 43.

In the example of FIG. 20, if the density value of a pixel included in the fourth gloss-control plane image data falls within a range from 1 to 17 (from 0% to 6%), the type of surface effect corresponding to the density value of the pixel is "PM", and the ON-OFF information indicates "ON". In this case, the density value of the pixel in the first clear toner plane image data Clr-1 and the second clear toner plane image data Clr-2 is not present ("no data"), and the density value of the pixel in the third clear toner plane image data Clr-3 is calculated by the "solid" and is expressed by 2 bits. Furthermore, the type of practicable surface effect is "PM".

In the present embodiment, the clear processing 108 refers to the surface effect selection table illustrated in FIG. 20 to determine whether to turn on or off the glosser 70 depending on the gloss priority or the type priority. Furthermore, the clear processing 108 uses turning ON or OFF of the glosser 70 thus determined, the surface effect selection table corresponding to the turning on or off of the glosser and the device configuration, and the fourth gloss-control plane image data thus received to generate 8-bit first clear toner plane image data Clr-1, 2-bit second clear toner plane image data Clr-2, and 2-bit third clear toner plane image data Clr-3. The clear processing 108 then performs halftone processing on the 8-bit first clear toner plane image data Clr-1, thereby converting the 8-bit first clear toner plane image data Clr-1 into 2-bit first clear toner plane image data Clr-1. Subsequently, the clear processing 108 outputs the ON-OFF instruction information instructing to turn on or off the glosser 70 and the 2-bit clear toner plane image data (Clr-1 to Clr-3) to the si3 unit 109.

The si3 unit 109 integrates the fifth color plane image data (2 bits×4 planes), which is 2-bit image data of CMYK on which the halftone processing is performed and the 2-bit clear toner plane image data (Clr-1 to Clr-3) (2 bits×3 planes) generated by the clear processing 108, and outputs the image data thus integrated to the MIC 40. In addition, the si3 unit 109 outputs the ON-OFF instruction information supplied from the clear processing 108 to the MIC 40. In the present embodiment, if "PG", "G", "M", and "PM" are specified in one page, for example, the DFE 30 outputs seven pieces of 2-bit image data (CMYK+Clr-1+Clr-2+Clr-3) and the ON-OFF instruction information instructing to turn "ON" the glosser 70 to the MIC 40.

The MIC 40 is connected to the DFE 30 and the printer device 50. The MIC 40 receives the fifth color plane image data (2 bits×4 planes) of CMYK and the first to the third clear toner plane image data from the DFE 30 and sorts each piece of the image data into a device corresponding thereto. In addition, the MIC 40 controls the post-processing device 75.

Figure 21:
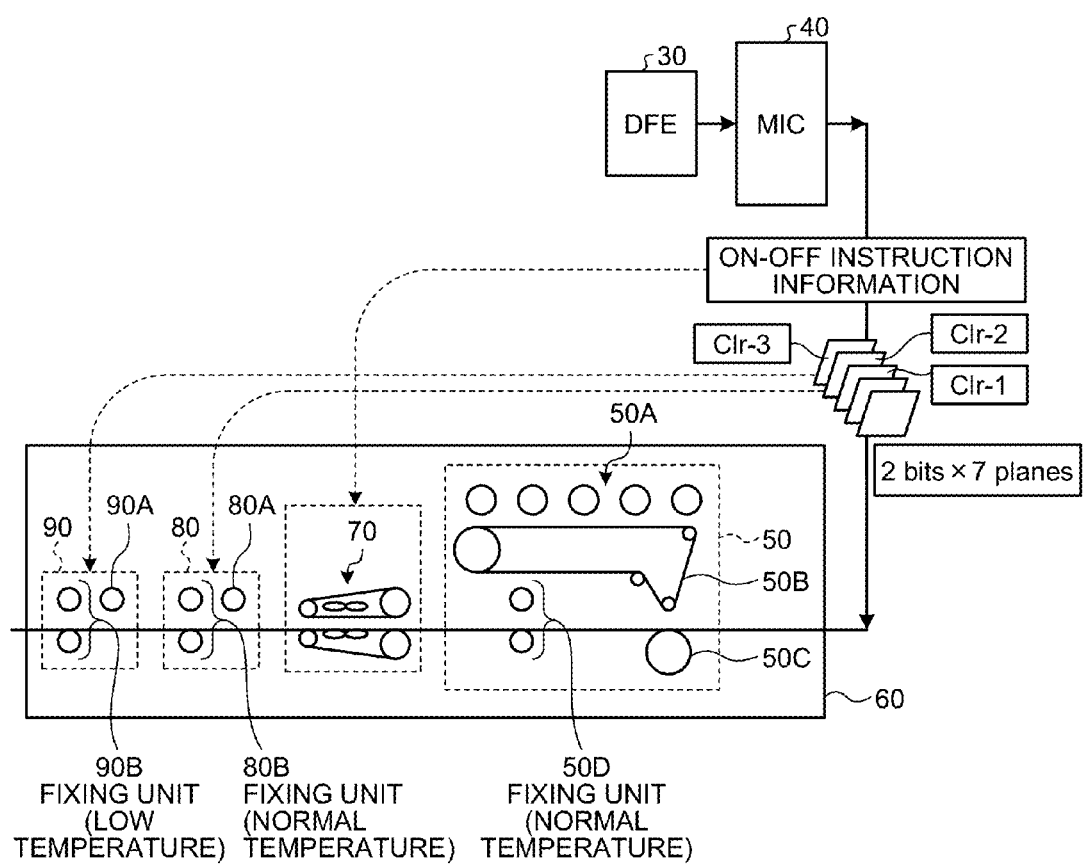
FIG. 21 is a schematic of a printing apparatus.

In this case, as illustrated in FIG. 21, the DFE 30 outputs the fifth color plane image data (2 bits×4 planes) of CMYK and the first clear toner plane image data Clr-1 to the printer device 50 via the MIC 40. Furthermore, the DFE 30 outputs the ON-OFF instruction information instructing to turn "ON" the glosser 70 to the glosser 70 via the MIC 40. As a result, the glosser 70 transits to an ON state. The DFE 30 further outputs the second clear toner plane image data Clr-2 to the normal fixing post-processing device 80 and outputs the third clear toner plane image data Clr-3 to the low-temperature fixing post-processing device 90 via the MIC 40.

In the example of FIG. 21, the printer device 50 uses the fifth color plane image data (2 bits×4 planes) of CMYK and the first clear toner plane image data Clr-1 output from the MIC 40 and irradiates the photosensitive element with a light beam output from the exposing unit. Thus, the printer device 50 forms a toner image corresponding to each toner on the photosensitive element. The printer device 50 then transfers the toner image onto a recording medium and fixes the toner image.

Specifically, the printer device 50 includes a plurality of electrophotography photosensitive elements 50A, a transfer belt 50B onto which a toner image formed on the photosensitive elements 50A is transferred, a transfer device 50C that transfers a toner image on the transfer belt 50B onto a recording medium, and a fixing unit 50D that fixes a toner image on a recording medium to the recording medium.

With this configuration, the clear toner is adhered to a recording medium in addition to the toner of CMYK, whereby an image is formed. Subsequently, if the recording medium is conveyed along a conveying path and reaches the position of the glosser 70 in the ON state, the glosser 70 presses (an area including an image forming area by the printer device 50 of) the recording medium at a high temperature and high pressure.

The normal fixing post-processing device 80 uses the second clear toner plane image data Clr-2 output from the MIC 40 to form a toner image with the clear toner. The normal fixing post-processing device 80 then transfers the toner image onto the recording medium passed through the glosser 70 and heats and presses the recording medium at the normal temperature to fix the toner image to the recording medium. The low-temperature fixing post-processing device 90 uses the third clear toner plane image data Clr-3 output from the MIC 40 to form a toner image with the clear toner. The low-temperature fixing post-processing device 90 then transfers the toner image onto the recording medium passed through the normal fixing post-processing device 80 and heats and presses the recording medium at a low temperature to fix the toner image to the recording medium.

In more detail, the normal fixing post-processing device 80 and the low-temperature fixing post-processing device 90 include a fixing unit 80B and a fixing unit 90B that fix a toner image transferred from electrophotography photosensitive elements 80A and 90A to a recording medium, respectively. The recording medium is conveyed by a conveying member, which is not illustrated, in order of the printer device 50, the glosser 70, the normal fixing post-processing device 80, and the low-temperature fixing post-processing device 90. After these devices sequentially perform processing on the recording medium to form an image and apply a surface effect, the recording medium is conveyed by a conveying mechanism, which is not illustrated, and is ejected outside of the printing apparatus 60.

Thus, a transparent image using the clear toner is formed on the recording medium. In the area for which the user specifies "PG", an effect as "PG" is realized, and in the area for which the user specifies "G", an effect as "G" is realized. Furthermore, in the area for which the user specifies "M", an effect as "M" is realized, and in the area for which the user specifies "PM", an effect as "PM" is realized. In other words, the device configuration including the glosser 70, the normal fixing post-processing device 80, and the low-temperature fixing post-processing device 90 as the post-processing device 75 can realize all the four types of surface effects of "PG", "G", "M", and "PM". No surface effect is applied to an area not specified as an area to which a surface effect is applied.

As described above, the display processing unit 15 according to the present embodiment generates the second color plane image data, the second clear plane image data, and the second gloss-control plane image data based on the document data. The display processing unit 15 generates the third clear plane image data and the third gloss-control plane image data by changing the color of the transparent image in the second clear plane image data and the color of the glossy area in the second gloss-control plane image data to the display color thus set. The display processing unit 15 then synthesizes the image data specified to be displayed (display-ON) by the display information between the third clear plane image data and the third gloss-control plane image data and the second color plane image data, thereby generating a synthetic image. The synthetic image is displayed on the display unit 99D.

Therefore, preview display can be switched depending on setting of whether to display the glossy area and setting of whether to display the transparent image made by the user.

Accordingly, the display processing unit 15 according to the present embodiment can switch between the glossy area to which a surface effect is to be applied and the transparent image as preview display.

Furthermore, the display processing unit 15 can specify a display color and transparency when an image is being displayed. Therefore, the display processing unit 15 can display both the transparent image and the glossy area even if the glossy area and the transparent image overlap with each other.

Second Embodiment

A display processing unit according to a second embodiment of the present invention performs processing for switching display depending on the types of surface effects in addition to the processing performed by the display processing unit according to the first embodiment.

In the second embodiment, components having similar functions and configurations as those in the first embodiment are represented by similar reference numeral, and detailed description thereof will be omitted.

FIG. 2 is a functional block diagram of a host device 11A according to the present embodiment. Instead of the classification unit 200D, the classification list storage unit 200E, the classified image data generating unit 200F, the classified image data storage unit 200G, the display image generating unit 200M, the synthetic image generating unit 200H, the display control unit 200J, the receiving unit 200K, and the display management information storage unit 200I included in the host device 11 according to the first embodiment, the host device 11A according to the second embodiment includes a classification unit 201D, a classification list storage unit 201E, a classified image data generating unit 201F, a classified image data storage unit 201G, a display image generating unit 201M, a synthetic image generating unit 201H, a display control unit 201J, a receiving unit 201K, and a display management information storage unit 201I.

Components different from those in the first embodiment will now be described in detail.

Similarly to the classification unit 200D, the classification unit 201D classifies each object (drawing area) in an object structure list into a drawing area group of color images specified by first color plane image data, a drawing area group of transparent images specified by first clear plane image data, and a drawing area group specified by first gloss-control plane image data.

In the present embodiment, the classification unit 201D further classifies the drawing area group specified by the first gloss-control plane image data by each type of surface effects. The classification unit 201D generates an object classification list indicating the drawing area of each type of surface effects, the drawing area group of color images specified by the first color plane image data, and the drawing area group of transparent images specified by the first clear plane image data.

Figure 22:
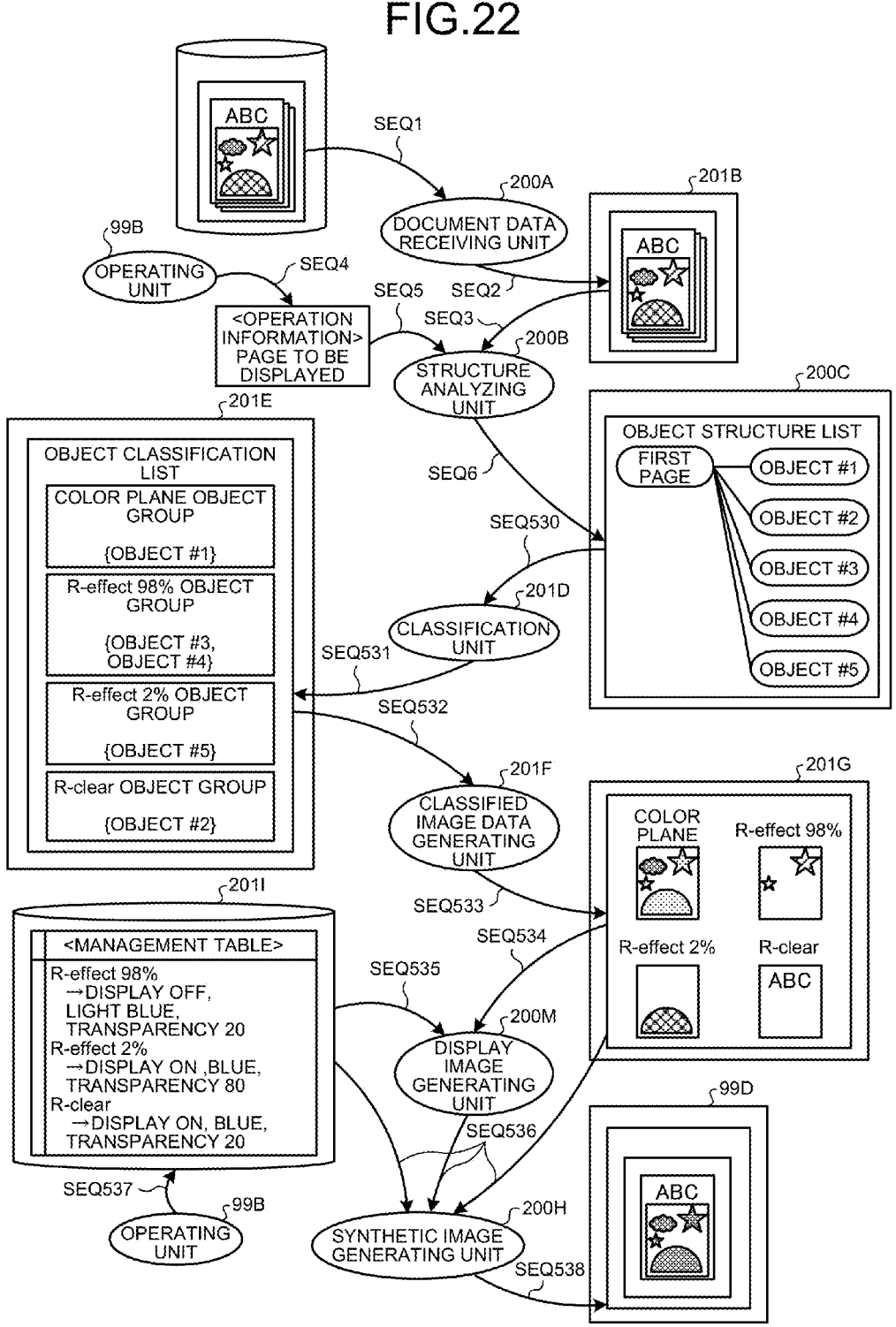
FIG. 22 is a sequence diagram of a process of image display processing performed by a display processing unit.

The classification list storage unit 201E stores therein the object classification list (also refer to the classification list storage unit 201E in FIG. 22).

Similarly to the classified image data generating unit 200F, the classified image data generating unit 201F generates second color plane image data and second clear plane image data as image data to be displayed based on document data, more specifically, on the object structure list and the object classification list. The classified image data generating unit 201F further generates second gloss-control plane image data for each type of surface effects based on the object structure list and the object classification list.

In other words, the classified image data generating unit 201F reads drawing information of a drawing area corresponding to each drawing area group for each type of surface effects of a glossy area specified by the first gloss-control plane image data in the object classification list from an object structure list storage unit 200C. The classified image data generating unit 201F then integrates drawing information obtained by converting the drawing information of the drawing area group thus read into a raster format for each type of surface effects and considers the drawing area group for each type of surface effects thus integrated to be a data group on a single page. Subsequently, the classified image data generating unit 201F generates image data based on information, such as the positional relationship and the back-and-forth relationship of the drawing areas included in the drawing area group, thereby generating the second gloss-control plane image data for each type of surface effects.

As described above, in the present embodiment, the classified image data generating unit 201F generates the second gloss-control plane image data for each type of surface effects in addition to the second color plane image data and the second clear plane image data.

The classified image data storage unit 201G stores therein each display image data generated by the classified image data generating unit 201F (also refer to the classified image data storage unit 201G in FIG. 22).

The display management information storage unit 201I stores therein a management table. The management table stores therein display management information corresponding to the glossy area and display management information corresponding to the transparent image. The display management information storage unit 201I according to the present embodiment stores therein the display management information for each type of surface effects of the glossy area.

Therefore, in the present embodiment, information indicating whether to display the glossy area on a display unit 99D (display ON information or display OFF information), display color information, and transparency information are set for each type of surface effects (also refer to the display management information storage unit 201I in FIG. 22).

The receiving unit 201K receives the display management information including the display information, the display color information, and the transparency information from an operating unit 99B, and stores the display management information in the management table of the display management information storage unit 201I. The display information, the display color information, and the transparency information are input by an operation instruction issued by the user through the operating unit 99B.

Input screen information indicating an input screen to be displayed on the display unit 99D used for setting the display information and the display color information is stored in advance in the display management information storage unit 201I, for example. Subsequently, with an operation on the operating unit 99B performed by the user, a signal indicating the start of setting of the display information and the display color information is input to a display processing unit 15. As a result, the display control unit 201J displays the input screen of the input screen information stored in the display management information storage unit 201I on the display unit 99D. Subsequently, with an operation instruction issued by the user through the operating unit 99B, the display information and the display color information are set.

The input screen 1090 illustrated in FIG. 12A is displayed on the display unit 99D, for example. An assumption is made that a check mark is placed in a check box 109C used for selecting whether to display a glossy area to which a surface effect is to be applied on the input screen 1090. In this case, in the present embodiment, the receiving unit 201K stores display-ON information indicating that a glossy area is displayed as display information in the management table in a manner associated with the information indicating the glossy area. If a switching button 109D is operated by an instruction issued by the user through the operating unit 99B, the display unit 99D displays an input screen 115 for setting the information indicating whether to display the glossy area, the display color information, and the transparency information for each type of surface effects as illustrated in FIG. 23.

The input screen 115 displays a selection button 115A used for selecting a glossy area to which a surface effect is to be applied. The input screen 115 also displays a selection button 115B used for selecting whether to display the glossy area selected by the selection button 115A. Furthermore, the input screen 115 includes a display color setting field 115C used for setting a display color that is a color of the glossy area selected by the selection button 115A when being displayed and a transparency setting field 115D used for setting transparency of the glossy area when being displayed. By operating the operating unit 99B, the user can set whether to display the glossy area, the display color, and the transparency of the glossy area when being displayed for each type of surface effects.

Figure 23:
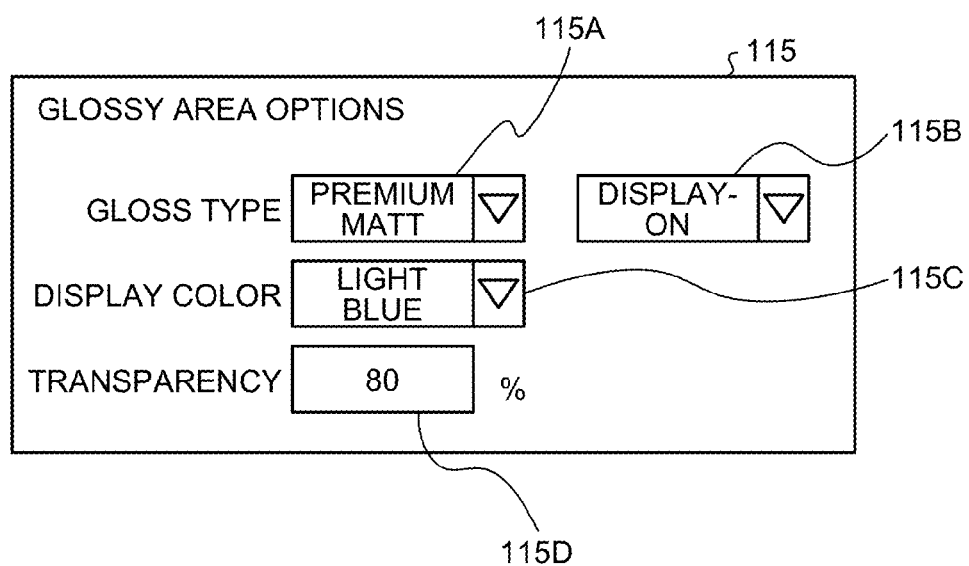
FIG. 23 is a schematic of an example of an input screen according to the second embodiment.

In the example illustrated in FIG. 23, for "PM" that is the type of surface effect for the area to which the surface effect is to be applied, information indicating that the area is displayed. Furthermore, light blue is set as the display color, and 80% is set as the transparency.

In this case, for "PM" that is the type of surface effect for the area to which the surface effect is to be applied, the receiving unit 201K stores display ON information, information indicating "light blue" as the display color information, and information indicating "80%" as the transparency information in the management table in a manner associated with the information indicating "PM" that is the type of surface effect.

The information indicating the type of surface effect may be information indicating the density value corresponding to the type of surface effect.

Referring back to FIG. 2, the explanation will be continued. The display image generating unit 201M converts the color and the transparency of the glossy area for each type of surface effects indicated by the second gloss-control plane image data stored in the classified image data storage unit 201G into the display color of the display color information (first display color information) and the transparency of the transparency information corresponding to the type of surface effect for the glossy area stored in the display management information storage unit 201I, thereby generating third gloss-control plane image data.

Similarly to the display image generating unit 200M, the display image generating unit 201M converts the color and the transparency of the transparent image of the second clear plane image data stored in the classified image data storage unit 200G into the display color of the display color information (second display color information) and the transparency of the transparency information corresponding to the transparent image stored in the display management information storage unit 201I, thereby generating third clear plane image data.

The synthetic image generating unit 201H synthesizes at least one of the third gloss-control plane image data and the third clear plane image data generated by the display image generating unit 201M and the second color plane image data stored in the classified image data storage unit 201G to generate a synthetic image indicating a preview image obtained by estimating a printing result of the document data.

Specifically, the synthetic image generating unit 201H reads the management table stored in the display management information storage unit 201I and reads a type of surface effect and a transparent image corresponding to the display information indicating display-ON between the glossy area for each type of surface effects and the transparent image. Subsequently, the synthetic image generating unit 201H reads the third gloss-control plane image data corresponding to the type of surface effect whose display information indicates display-ON from the display image generating unit 201M and reads the third clear plane image data whose display information indicates display-ON from the display image generating unit 201M.

The synthetic image generating unit 201H then synthesizes the second color plane image data and the third gloss-control plane image data and the third clear plane image data thus read to generate a synthetic image.

The display control unit 201J displays the synthetic image generated by the synthetic image generating unit 201H on the display unit 99D.

The display processing performed by the display processing unit 15 will now be described.

FIG. 22 is a sequence diagram of a process of the image display processing performed by the display processing unit 15. FIG. 22 is a sequence diagram of a process of the image display processing until the display image obtained by estimating a printing result of the document data illustrated in FIG. 11 is displayed on the display unit 99D.

The display processing unit 15 displays the input screen 1090 illustrated in FIG. 12A on the display unit 99D. The user then issues an operation instruction through the operating unit 99B, thereby operating a PDF selection button 109E for issuing a selection instruction of document data to be displayed. If the document data serving as a preview target is selected, a document data receiving unit 200A reads the document data thus specified and loads the document data on a primary memory 201B (SEQ1 and SEQ2).

Subsequently, if a page to be displayed is selected by an operation instruction issued by the user through the operating unit 99B (SEQ4), a structure analyzing unit 200B reads document data of the page corresponding to the selection result from the primary memory 201B and analyzes the document data (SEQ3 and SEQ5).

The structure analyzing unit 200B then stores an object structure list, which is the analysis result, in the object structure list storage unit 200C (SEQ6).

The classification unit 201D classifies an object #1 to an object #5 listed in the object structure list stored in the object structure list storage unit 200C into a drawing area group of color images specified by the first color plane image data, a drawing area group of transparent images specified by the first clear plane image data, and a drawing area group of glossy areas for each type of surface effects specified by the first gloss-control plane image data to generate an object classification list (SEQ530 and SEQ531).

In the document data illustrated in FIG. 11, the object #3 to the object #5 each represent drawing information of a glossy area. As illustrated in FIG. 11, because the same density value (98%) is set for the object #3 and the object #4, the types of surface effects of the object #3 and the object #4 are identical to each other. By contrast, because a density value of 2% is set for the object #5, the type of surface effect of the object #5 is different from that of the object #3 and the object #4.

Therefore, the classification unit 201D classifies the object #3 to the object #5 into an object group of the same type of surface effect, and classifies the object #5 as an object group of a different type of surface effect among the object #3 to object #4.

The classified image data generating unit 201F integrates the object group of color images in the object classification list to generate the second color plane image data. The classified image data generating unit 201F generates the second clear plane image data from the object group of transparent images in the object classification list. The classified image data generating unit 201F generates the second gloss-control plane image data for each type of surface effects from an object group of each type of surface effects. Thus, the classified image data generating unit 201F generates the second color plane image data, the second clear plane image data, and the second gloss-control plane image data for each type of surface effects (SEQ532 and SEQ533).

The display image generating unit 201M converts the color and the transparency of the glossy area of the second gloss-control plane image data for each type of surface effects stored in the classified image data storage unit 201G into the display color of the display color information (first display color information) and the transparency of the transparency information corresponding to each type of surface effects for the glossy area stored in the display management information storage unit 201I, respectively, thereby generating the third gloss-control plane image data for each type of surface effects. Furthermore, the display image generating unit 201M converts the color and the transparency of the transparent image of the second clear plane image data stored in the classified image data storage unit 201G into the display color of the display color information (second display color information) and the transparency of the transparency information corresponding to the transparent image stored in the display management information storage unit 201I, respectively, thereby generating the third clear plane image data (SEQ534 and SEQ535).

The display management information including the display information, the display color information, and the transparency information received from the operating unit 99B is stored in the management table of the display management information storage unit 201I (SEQ537).

The synthetic image generating unit 201H synthesizes display image data whose display information in the management table stored in the display management information storage unit 201I indicates display-ON between the display image data for each type of surface effects and the clear plane display image data and color plane display image data to generate one display image (SEQ534 and SEQ535). The synthetic image generating unit 201H synthesizes the third clear plane image data and the third gloss-control plane image data for each type of surface effects generated by the display image generating unit 201M and whose display information indicates display-ON and the second color plane image data stored in the classified image data storage unit 201G to generate a synthetic image indicating a preview image obtained by estimating a printing result of the document data (SEQ536).

The synthetic image generated by the synthetic image generating unit 201H is displayed on the display unit 99D by the display control unit 201J, which is not illustrated in FIG. 22 (SEQ538).

By performing the image display processing described above, the following display image is displayed, for example.

Figure 24:
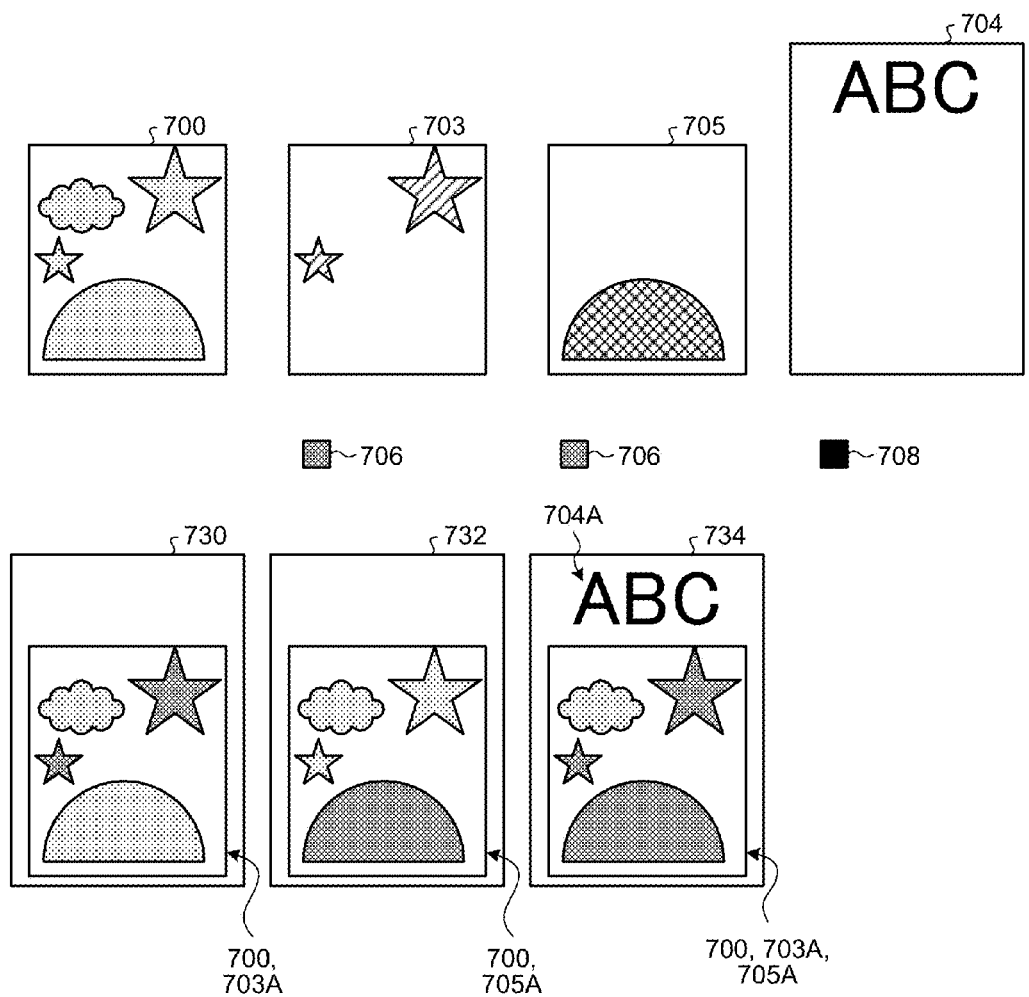
FIG. 24 is a schematic of an example of a synthetic image generated by performing image display processing according to the second embodiment.

As illustrated in FIG. 24, for example, an assumption is made that second color plane image data 700, second gloss-control plane image data 703 whose surface effect type is "PG" (density of 98%), second gloss-control plane image data 705 whose surface effect type is "PM" (density of 2%), and second clear plane image data 704 are stored in the classified image data storage unit 201G.

An assumption is made that light blue 706 is set as a display color of the type of surface effect "PG" (density of 98%) and that the light blue 706 is set as a display color of the type of surface effect "PM" (density of 2%). Furthermore, an assumption is made that red 708 is set as a display color of the clear plane.

In this case, the display image generating unit 201M generates third gloss-control plane image data 703A by changing the color of the second gloss-control plane image data 703 whose surface effect type is "PG" (density of 98%) into the light blue 706, third gloss-control plane image data 705A by changing the color of the second gloss-control plane image data 705 whose surface effect type is "PM" (density of 2%) into the light blue 706, third gloss-control plane image data 703A by changing the color of the second gloss-control plane image data 703 whose surface effect type is "PG" (density of 98%) into the light blue 706, and third clear plane image data 704A by changing the color of the second clear plane image data 704 into the red 708.

An assumption is made that the display information stored in the display management information storage unit 201I indicates that "PG" (density of 98%) is displayed (display-ON) and that "PM" (density of 2%) and the transparent image are not displayed (display-OFF).

The synthetic image generating unit 201H then synthesizes the third gloss-control plane image data 703A obtained by changing the color of the second gloss-control plane image data 703 whose surface effect type is "PG" (density of 98%) into the light blue 706 and the second color plane image data 700 to generate synthetic image data 730 of a synthetic image. Therefore, in this case, the display unit 99D displays the synthetic image of the synthetic image data 730.

An assumption is made that the display information stored in the display management information storage unit 201I indicates that "PG" (density of 98%) and the transparent image are not displayed (display-OFF) and that "PM" (density of 2%) is displayed (display-ON). In this case, the synthetic image generating unit 201H synthesizes the third gloss-control plane image data 705A obtained by changing the color of the second gloss-control plane image data 705 whose surface effect type is "PM" (density of 2%) into the light blue 706 and the second color plane image data 700 to generate synthetic image data 732. Therefore, in this case, the display unit 99D displays a synthetic image of the synthetic image data 732.

An assumption is made that the display information stored in the display management information storage unit 201I indicates that "PG" (density of 98%) and the transparent image are not displayed (display-OFF) and that "PM" (density of 2%) is displayed (display-ON). In this case, the synthetic image generating unit 201H synthesizes the third gloss-control plane image data 705A obtained by changing the color of the second gloss-control plane image data 705 whose surface effect type is "PM" (density of 2%) into the light blue 706, the third gloss-control plane image data 703A obtained by changing the color of the second gloss-control plane image data 703 whose surface effect type is "PG" (density of 98%) into the light blue 706, and the third clear plane image data 704A obtained by changing the color of the second clear plane image data 704 into the red 708 and the second color plane image data 700 to generate synthetic image data 734. Therefore, in this case, the display unit 99D displays a synthetic image of the synthetic image data 734.

As described above, according to the present embodiment, the second gloss-control plane image data is generated for each type of surface effects. Subsequently, the third gloss-control plane image data of the type of surface effect specified to be displayed (display-ON) by the display information, the third clear plane image data, and the second color plane image data are synthesized to generate a synthetic image. The synthetic image is then displayed on the display unit 99D.

Therefore, it is possible to provide a function to switch display depending on the types of surface effects in addition to the functions according to the first embodiment.

While the explanations have been made of the embodiments of the present invention, the present invention is not limited to the embodiments. Various changes and modifications can be made without departing from the spirit and scope of the present invention.

While the display processing unit 15 is provided to the host device 11 or 11A in the embodiments, the display processing unit 15 may be provided to the DFE 30, for example.

While the clear toner is used for printing a transparent image and applying a surface effect in the present embodiment, any color material including a transparent developer may be used, and toner is not necessarily used. Instead of the clear toner, a transparent liquid developer may be used, for example.

While the printer device 50 forms an image using toner in a plurality of colors of CMYK, the printer device 50 may form an image using monochromatic toner.

Third Embodiment

While the host device 11 and the host device 11A generate a synthetic image in the first embodiment and the second embodiment, the present invention is not limited thereto.

In other words, any of a plurality of processes performed by a first device may be performed by one or more second devices connected to the first device via a network.

In an image forming system according to a third embodiment of the present invention, for example, a part of functions of a host device is implemented on a server device on a network.

Figure 25:
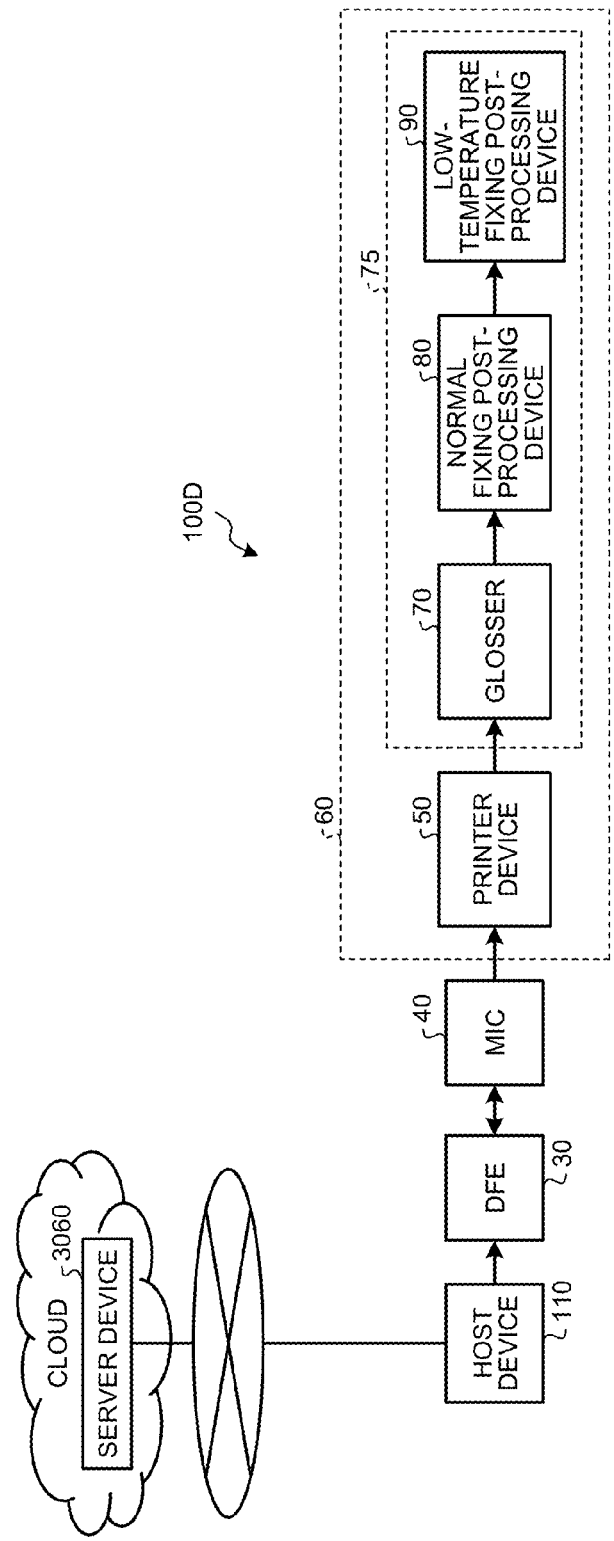
FIG. 25 is an exemplary schematic of a configuration of an image forming system.

FIG. 25 is an exemplary schematic of a configuration of an image forming system according to the present embodiment. As illustrated in FIG. 25, an image forming system 100D according to the present embodiment includes a host device 110, a DFE 30, an MIC 40, and a printing apparatus 60.

In the present embodiment, the host device 110 is connected to a server device 3060 via a network such as the Internet. Furthermore, in the present embodiment, functions of the analyzing unit 200L, the classified image data generating unit 200F, the display image generating unit 200M, and the synthetic image generating unit 200H in the host device 11 according to the first embodiment are provided to the server device 3060.

The configurations of the host device 110, the DFE 30, the MIC 40, and the printing apparatus 60 are the same as those in the first embodiment.

In other words, specifically, the host device 110 is connected to the single server device 3060 via a network (cloud) such as the Internet in the present embodiment. The server device 3060 is provided with the functions of the analyzing unit 200L, the classified image data generating unit 200F, the display image generating unit 200M, and the synthetic image generating unit 200H according to the first embodiment and performs generation process of a synthetic image.

Figure 26:
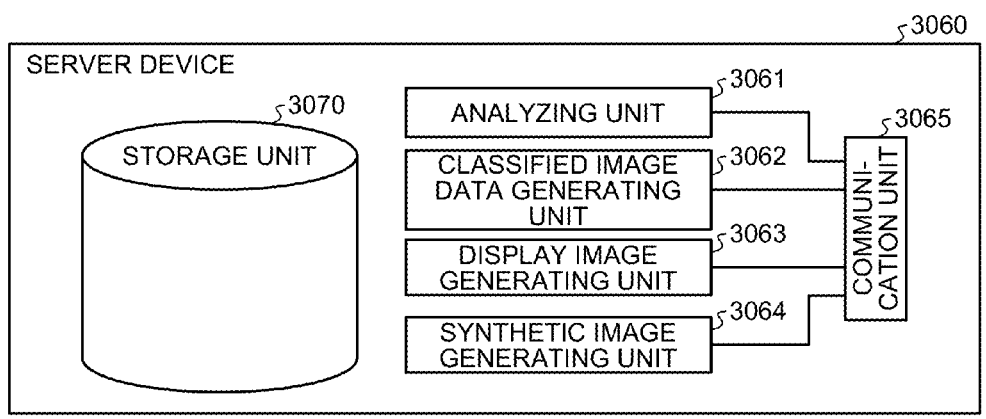
FIG. 26 is a block diagram of a functional configuration of a server device.

The server device 3060 will now be described. FIG. 26 is a block diagram of a functional configuration of the server device 3060 according to the present embodiment. The server device 3060 mainly includes a storage unit 3070, an analyzing unit 3061, a classified image data generating unit 3062, a display image generating unit 3063, a synthetic image generating unit 3064, and a communication unit 3065.

The communication unit 3065 transmits and receives various types of data and requests to and from the host device 110. More specifically, the communication unit 3065 receives first data including document data and display information stored in a management table stored in a display management information storage unit 200I from the host device 110. Furthermore, the communication unit 3065 transmits a synthetic image synthesized by the synthetic image generating unit 3064 to the host device 110.

The functions of the analyzing unit 3061, the classified image data generating unit 3062, the display image generating unit 3063, and the synthetic image generating unit 3064 are the same as those of the analyzing unit 200L, the classified image data generating unit 200F, the display image generating unit 200M, and the synthetic image generating unit 200H described in the first embodiment, respectively.

The storage unit 3070 is a storage medium, such as an HDD and a memory, and stores therein an object structure list and second color plane image data, second gloss-control plane image data, and second clear plane image data generated by the classified image data generating unit 3062. The storage unit 3070 stores therein an object classification list classified by the analyzing unit 3061. The storage unit 3070 stores therein the first data received by the communication unit 3065.

The host device 110 will now be described.

Figure 27:
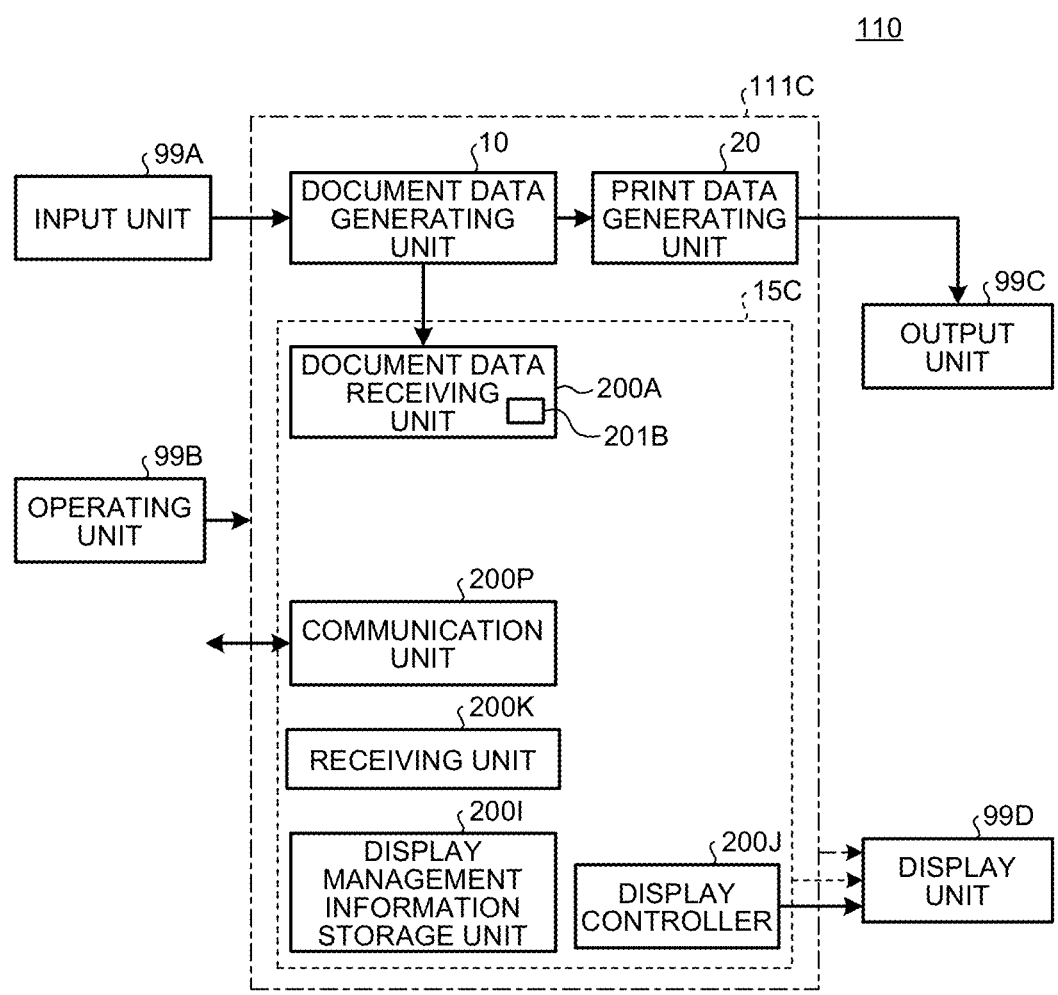
FIG. 27 is a functional block diagram of a host device.

FIG. 27 is a functional block diagram of the host device 110. The host device 110 includes the display unit 99D, the input unit 99A, the operating unit 99B, the output unit 99C, and a control unit 111C. The control unit 111C includes a document data generating unit 10, a print data generating unit 20, and a display processing unit 15C.

The document data generating unit 10 and the print data generating unit 20 are the same as those in the first embodiment.

The display processing unit 15C includes the document data receiving unit 200A, a communication unit 200P, the receiving unit 200K, the display management information storage unit 200I, and the display control unit 200J. The document data receiving unit 200A, the receiving unit 200K, the display management information storage unit 200I, and the display control unit 200J are the same as those in the first embodiment.

The communication unit 200P transmits the first data to the host device 110. The communication unit 200P receives a synthetic image from the host device 110.

Image display processing performed by the display processing unit 15C of the host device 110 according to the present embodiment will now be described.

Figure 28:
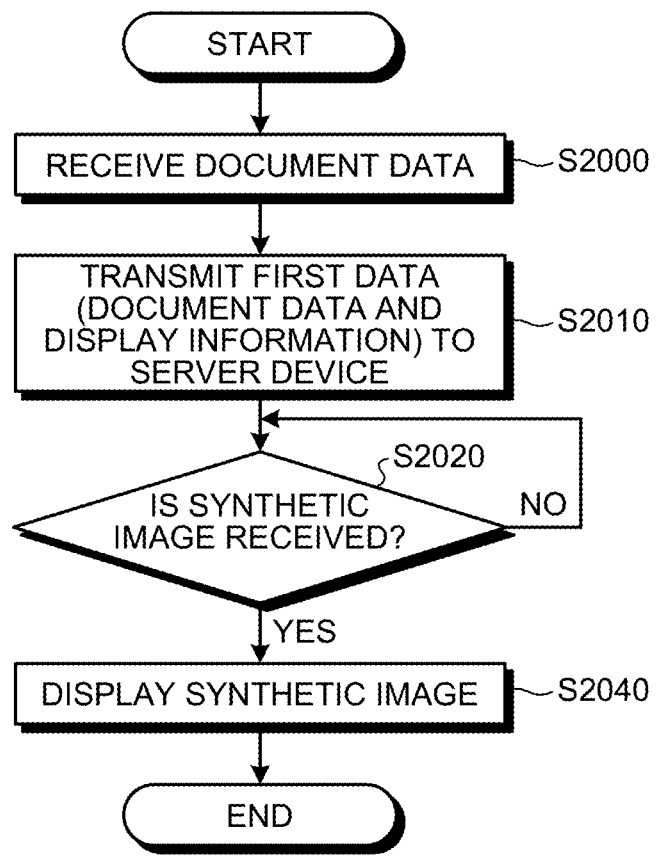
FIG. 28 is a flowchart of a process of image display processing.

FIG. 28 is a flowchart of a process of the image display processing performed by the display processing unit 15C of the host device 110.

The document data receiving unit 200A receives document data (Step S2000). The document data received by the document data receiving unit 200A is loaded on a primary memory 201B.

The communication unit 200P transmits the first data including the document data received at Step S2000 and display information stored in the display management information storage unit 200I to the server device 3060 (Step S2010).

The communication unit 200P repeats a negative determination until the communication unit 200P receives a synthetic image from the server device 3060 (No at Step S2020). If a positive determination is made at Step S2020 (Yes at Step S2020), the system control goes to Step S2040.

At Step S2040, the display control unit 200J performs control so as to display the synthetic image received at Step S2020 on the display unit 99D (Step S2040). Subsequently, the routine is terminated.

Figure 29:
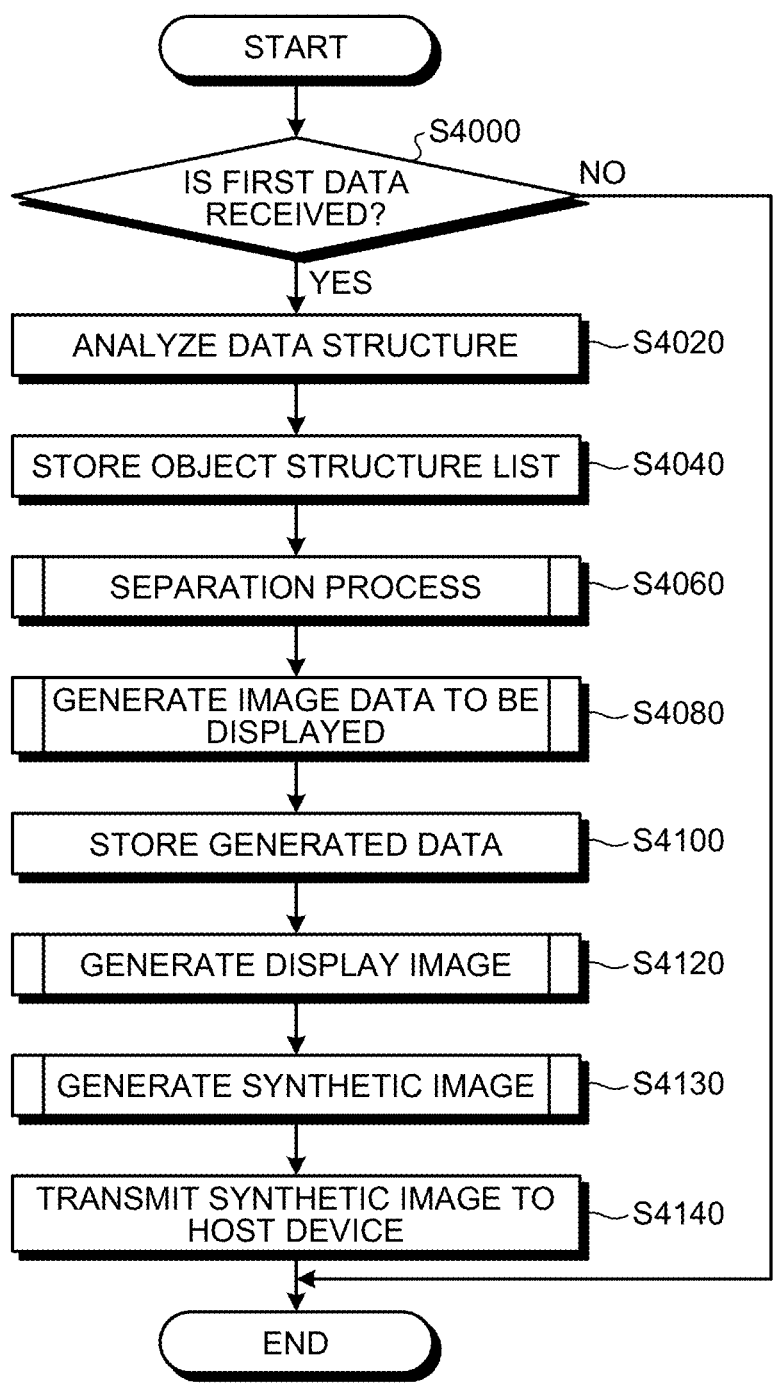
FIG. 29 is a flowchart of a process of image processing.

A process of image processing performed by the server device 3060 will now be described. FIG. 29 is a flowchart of a process of the image processing performed by the server device 3060.

The communication unit 3065 of the server device 3060 determines whether the first data is received from the host device 110 (Step S4000). If a negative determination is made at Step S4000 (No at Step S4000), the routine is terminated.

By contrast, if a positive determination is made at Step S4000 (Yes at Step S4000), the system control goes to Step S4020.

At Step S4020, the analyzing unit 3061 analyzes the data structure of document data included in the first data received at Step S4000 and creates an object structure list indicating objects included in each page of the document data (Step S4020). The analyzing unit 3061 then stores the object structure list in the storage unit 3070 (Step S4040).

Similarly to Step S406 (refer to FIG. 14) in the first embodiment, the analyzing unit 3061 performs separation process on the document data to generate an object classification list (Step S4060).

The classified image data generating unit 3062 generates the second color plane image data, the second gloss-control plane image data, and the second clear plane image data as image data to be displayed and stores the image data in the storage unit 3070 (Step S4080 and Step S4100). The processing at Step S4080 is the same as the processing at Step S408 in FIG. 14.

The display image generating unit 3063 performs display image generation process for generating the third gloss-control plane image data and the third clear plane image data (Step S4120).

The synthetic image generating unit 3064 performs synthetic image generation process for generating a synthetic image indicating a preview image obtained by estimating a printing result of the document data (Step S4130). The processing at Step S4130 is the same as the processing at Step S413 in FIG. 14.

The communication unit 3065 transmits the synthetic image generated at Step S4130 to the host device 110 (Step S4140), the routine is terminated.

As described above, in the present embodiment, the server device 3060 on the cloud generates a synthetic image. As a result, an advantageous effect to collectively generate a synthetic image even if a plurality of host devices 110 are present can be realized besides the advantageous effects according to the first embodiment, resulting in convenience for an administrator.

While the single server device 3060 on the cloud includes the analyzing unit 3061, the classified image data generating unit 3062, the display image generating unit 3063, and the synthetic image generating unit 3064 in the present embodiment, the configuration is not limited thereto.

Alternatively, two or more server devices may be provided on the cloud, for example, and the processing described above may be distributed to and performed by the two or more server devices. The aspect of distribution of the processing to the server devices is not limited thereto and may be performed arbitrarily.

In other words, as long as the host device 110 has the minimum configuration including the input unit 99A, the output unit 99C, the display control unit 200J, and the communication unit 200P, for example, it is possible to arbitrarily perform a part or the whole of the processing by a single server device on the cloud collectively or by a plurality of server devices in a distributed manner.

In other words, as in the example described above, any of a plurality of processes performed by the first device may be performed by one or more second devices connected to the first device via a network.

Furthermore, if any of a plurality of processes is performed by one or more second devices connected to the first device via a network, input-output processing of data between the first device and the second devices and between the second devices, such as processing for outputting data (information) generated by processing performed by the first device from the first device to the second devices and processing for inputting the data to the second devices, is performed.

In other words, if one device is provided as the second devices, input-output processing of data between the first device and the second device is performed. By contrast, if two or more devices are provided as the second devices, input-output processing of data between the first device and the second devices and input-output processing of data between the second devices, such as between a first second-device and a second second-device, are performed.

While one or a plurality of server devices, such as the server device 3060, are provided on the cloud in the present embodiment, the configuration is not limited thereto. Alternatively, one or a plurality of server devices, such as the server device 3060, may be provided on any type of network, such as an intranet.

The hardware configuration of the host device 11, 11A, and 110, the DFE 30, and the server device 3060 according to the embodiments will now be described.

Figure 30:
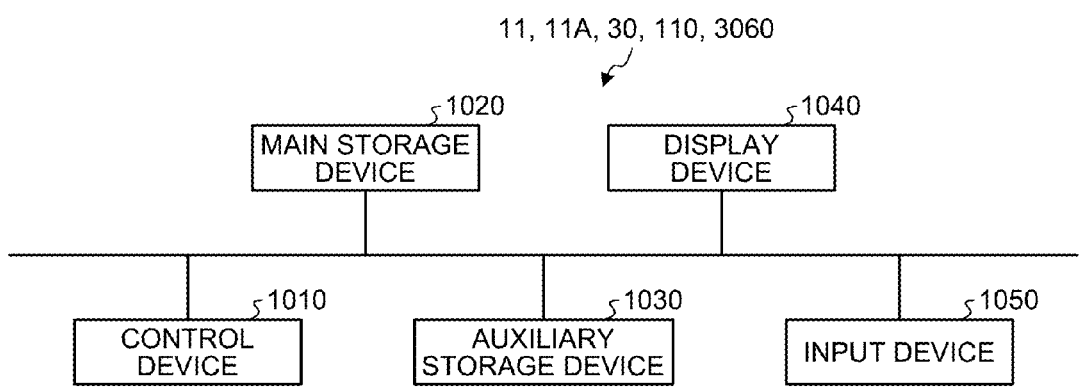
FIG. 30 is a block diagram of an exemplary hardware configuration of the host device and the DFE.

FIG. 30 is a block diagram of an exemplary hardware configuration of the host device 11, 11A, and 110, the DFE 30, and the server device 3060 according to the present embodiment. The host device 11, 11A, and 110, the DFE 30, and the server device 3060 according to the present embodiment include a control device 1010 such as a CPU, a main storage device 1020 such as a ROM and a RAM, an auxiliary storage device 1030 such as an HDD and a CD drive, a display device 1040 such as a display, and an input device 1050 such as a keyboard and a mouse, and have a hardware configuration using a typical computer.

The computer program executed in the host device 11, 11A, and 110, the DFE 30, and the server device 3060 according to the present embodiment may be provided in a manner recorded in a computer-readable recording medium, such as a compact disk read-only memory (CD-ROM), a flexible disk (FD), a compact disk recordable (CD-R), and a digital versatile disk (DVD), as a file in an installable or executable format.

The computer program executed in the host device 11, 11A, and 110, the DFE 30, and the server device 3060 according to the present embodiment may be provided in a manner stored in a computer connected to a network such as the Internet to be made available for downloads via the network. Furthermore, the computer program executed in the host device 11, 11A, and 110, the DFE 30, and the server device 3060 according to the present embodiment may be provided or distributed over a network such as the Internet. Moreover, a control program executed in the host device 11, 11A, and 110, the DFE 30, and the server device 3060 according to the present embodiment may be provided in a manner incorporated in a ROM and the like in advance.

The computer program executed in the host device 11, 11A, and 110, the DFE 30, and the server device 3060 according to the present embodiment has a module configuration including each unit described above. In actual hardware, the CPU (processor) reads and executes the control program from the storage medium described above to load each unit on the main memory. Thus, each unit is generated on the main memory. While the host device 11, 11A, and 110, the DFE 30, and the server device 3060 perform processing according to the present embodiment in the embodiments described above, it is not limited thereto. An arbitrary type of device may perform the processing according to the present embodiment, and a PC may perform the processing, for example.

While the image forming system 100 includes the host device 11 (11A, 110), the DFE 30, the MIC 40, and the printing apparatus 60 in the embodiments, the configuration is not limited thereto. Alternatively, the host device 11 (11A, 110), the DFE 30, the MIC 40, and the printing apparatus 60 may be formed integrally as one image forming apparatus, for example.

The MIC 40 and the printer device 50 may be formed integrally.

While the printer system according to the embodiments includes the MIC 40, the configuration is not limited thereto. By causing other devices, such as the DFE 30, to perform the processing and the functions of the MIC 40, the MIC 40 may be omitted.

According to the embodiments, it is possible to provide a display processing apparatus, an image forming system, and a computer-readable storage medium that can switch between a glossy area to which a surface effect is to be applied and a transparent image as preview display.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display processing apparatus comprising:
   a surface effect display data generating unit configured to, based on first surface effect display data and surface effect color information, generate second surface effect display data, the first surface effect display data being generated based on control plane image data that specifies a surface effect area on a recording medium to which a surface effect is to be applied and being used for displaying the surface effect on a display unit, and the surface effect color information indicating a display color used when the first surface effect display date is displayed on the display unit;
   a clear plane image display data generating unit configured to, based on first clear plane image display data and transparent image color information, generate second clear plane image display data, the first clear plane image display data being generated based on clear plane image data that specifies a transparent image formed on the recording medium and being used for displaying the transparent image on the display unit; and
   a display control unit configured to make a control that displays the second surface effect display data and the second clear plane image display data on the display unit.

2. The display processing apparatus according to claim 1, further comprising:
   a first generating unit configured to generate, based on document data including first color plane image data indicating a color image for each drawing area, the control plane image data indicating a type of a surface effect and an area to which the surface effect is to be applied for each drawing area, and clear plane image data indicating a transparent image for each drawing area, second color plane image data serving as the color plane image data that specifies a density value of the color image for each pixel, first surface effect display data that specifies a density value corresponding to the type of the surface effect for each pixel, and first clear plane image display data that specifies a density value of the transparent image for each pixel;
   a storage unit configured to store therein in advance first transparent image color information indicating a color of the area when being displayed and second transparent image color information indicating a color of the transparent image when being displayed; and
   a second generating unit configured to generate data second surface effect display data serving as the plane image data obtained by converting the color of the area specified by the second plane image data into a display color of the first transparent image color information and second clear plane image display data serving as the clear plane image data obtained by converting the color of the transparent image specified by the first clear plane image display data into a display color of the second transparent image color information, wherein the generating unit generates a synthetic image by synthesizing the second color plane image data and one of the generated second surface effect display data and the generated second clear plane image display data that is specified to be displayed by the display information.

3. The display processing apparatus according to claim 2, further comprising an analyzing unit including a structure analyzing unit configured to analyze a structure of the document data by creating an object structure list indicating a list of drawing areas included in the document data; and a classification unit configured to classify the drawing areas indicated by the object structure list into a first drawing area group indicating the color image, a second drawing area group indicating the area, and a third drawing area group indicating the transparent image, wherein the first generating unit generates, based on a result of analysis performed by the analyzing unit, the second color plane image data based on image data obtained by integrating the drawing areas belonging to the first drawing area group, the first surface effect display data based on image data obtained by integrating the drawing areas belonging to the second drawing area group, and the first clear plane image display data based on image data obtained by integrating the drawing areas belonging to the third drawing area group.

4. The display processing apparatus according to claim 3, wherein the classification unit further classifies the second drawing area group by each type of the surface effect, the first generating unit generates a plurality of pieces of the first surface effect display data by integrating the drawing areas belonging to the second drawing area group for each type of the surface effect, the storage unit stores therein a plurality of types of the first transparent image color information indicating the color of the area when being displayed for each type of the surface effect, the second generating unit generates the second surface effect display data by converting the color of the area specified by the first surface effect display data into a display color of the first transparent image color information corresponding to the type of the surface effect of the area, the receiving unit receives the display information indicating whether the third plane image data generated for each type of the surface effect of the area is displayed and whether the second clear plane image display data is displayed, and the generating unit generates a synthetic image by synthesizing the second color plane image data and one of one or a plurality of types of the second surface effect display data and the second clear plane image display data that is specified to be displayed by the display information.

5. The image processing apparatus according to claim 1, wherein the transparent image and the surface effect are formed by applying a transparent developer to the recording medium.

6. An image forming system comprising:

a printing unit configured to form an image on a recording medium based on document data; and a display processing apparatus configured to display a synthetic image indicating a preview image obtained by estimating a result of printing performed by the printing unit on a display unit, wherein the display processing apparatus includes a surface effect display data generating unit configured to, based on first surface effect display data and surface effect color information, generate second surface effect display data, the first surface effect display data being generated based on control plane image data that specifies a surface effect area on a recording medium to which a surface effect is to be applied and being used for displaying the surface effect on a display unit, and the surface effect color information indicating a display color used when the first surface effect display date is displayed on the display unit;

a clear plane image display data generating unit configured to, based on first clear plane image display data and transparent image color information, generate second clear plane image display data, the first clear plane image display data being generated based on clear plane image data that specifies a transparent image formed on the recording medium and being used for displaying the transparent image on the display unit; and a display control unit configured to make a control that displays the second surface effect display data and the second clear plane image display data on the display unit.

7. A non-transitory computer-readable recording medium with an executable program stored thereon, wherein the program instructs a processor to perform:

based on first surface effect display data and surface effect color information, generating second surface effect display data, the first surface effect display data being generated based on control plane image data that specifies a surface effect area on a recording medium to which a surface effect is to be applied and being used for displaying the surface effect on a display unit, and the surface effect color information indicating a display color used when the first surface effect display date is displayed on the display unit;

based on first clear plane image display data and transparent image color information, generating second clear plane image display data, the first clear plane image display data being generated based on clear plane image data that specifies a transparent image formed on the recording medium and being used for displaying the transparent image on the display unit; and displaying the second surface effect display data and the second clear plane image display data on a display unit.

* * * * *